United States Patent
Wang

(10) Patent No.: US 10,337,861 B2
(45) Date of Patent: Jul. 2, 2019

(54) IMAGE GENERATING DEVICE FOR GENERATING DEPTH MAP WITH PHASE DETECTION PIXEL

(71) Applicant: Tae-Shick Wang, Seoul (KR)

(72) Inventor: Tae-Shick Wang, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 280 days.

(21) Appl. No.: 14/963,753

(22) Filed: Dec. 9, 2015

(65) Prior Publication Data
US 2016/0239974 A1    Aug. 18, 2016

(30) Foreign Application Priority Data
Feb. 13, 2015 (KR) .................. 10-2015-0022298

(51) Int. Cl.
*G06T 7/00* (2017.01)
*G01C 3/32* (2006.01)
*G06T 7/55* (2017.01)

(52) U.S. Cl.
CPC .............. *G01C 3/32* (2013.01); *G06T 7/55* (2017.01); *G06T 2207/10148* (2013.01)

(58) Field of Classification Search
CPC .... G01C 3/32; G06T 2207/10148; G06T 7/55
See application file for complete search history.

(56) References Cited

U.S. PATENT DOCUMENTS

| | | | |
|---|---|---|---|
| 8,810,665 B2 | 8/2014 | Uehara | |
| 8,855,479 B2 | 10/2014 | Yasuda | |
| 8,922,703 B2 | 12/2014 | Takeuchi | |
| 2009/0080876 A1 | 3/2009 | Brusnitsyn et al. | |
| 2010/0150538 A1 | 6/2010 | Ono et al. | |
| 2010/0238343 A1 | 9/2010 | Kawarada | |
| 2011/0274420 A1* | 11/2011 | Yasuda .................. | G02B 7/36 396/125 |
| 2012/0212661 A1 | 8/2012 | Yamaguchi et al. | |
| 2012/0327291 A1* | 12/2012 | Takeuchi ........... | H04N 5/23212 348/353 |

(Continued)

FOREIGN PATENT DOCUMENTS

| | | |
|---|---|---|
| CN | 101750847 A | 6/2010 |
| CN | 101841656 A | 9/2010 |

(Continued)

*Primary Examiner* — Zhihan Zhou
(74) *Attorney, Agent, or Firm* — Harness, Dickey & Pierce, P.L.C.

(57) ABSTRACT

An image generating device for generating a depth map is provided. The image generating device includes an image sensor including phase detection pixels, a lens driver adjusting a position of a lens to adjust a distance between the lens and an object, a phase difference calculator calculating first phase differences based on first phase signals generated when the lens is placed in a first position and calculating second phase differences based on second phase signals generated when the lens is placed in a second position being different from the first position, and a depth map generator generating first and second depth data associated with a distance between the phase detection pixels and the object based on the first and second phase differences and generating a depth map based on the first and second depth data.

17 Claims, 13 Drawing Sheets

(56) References Cited

U.S. PATENT DOCUMENTS

| | | | |
|---|---|---|---|
| 2013/0258168 A1* | 10/2013 | Aoki | G02B 7/34 348/349 |
| 2014/0036134 A1* | 2/2014 | Miyatani | H04N 5/23212 348/345 |
| 2014/0340567 A1 | 11/2014 | Fukuda | |
| 2014/0368613 A1* | 12/2014 | Krupka | G01S 17/36 348/46 |
| 2015/0043826 A1 | 2/2015 | Ishimitsu | |
| 2015/0091899 A1* | 4/2015 | Grangetto | G06T 19/20 345/419 |
| 2016/0124089 A1* | 5/2016 | Meinherz | G01S 17/08 356/5.01 |

FOREIGN PATENT DOCUMENTS

| | | |
|---|---|---|
| CN | 102645818 A | 8/2012 |
| CN | 103581547 A | 2/2014 |
| CN | 104184939 A | 12/2014 |
| CN | 104349056 A | 2/2015 |
| JP | 2012-124553 A | 6/2012 |
| JP | 2012-230258 A | 11/2012 |
| JP | 5178553 B2 | 4/2013 |
| JP | 5361598 B2 | 12/2013 |
| JP | 5615756 B2 | 10/2014 |

* cited by examiner

IMAGE GENERATING DEVICE FOR GENERATING DEPTH MAP WITH PHASE DETECTION PIXEL

CROSS-REFERENCE TO RELATED APPLICATIONS

The present application claims priority under 35 U.S.C. § 119 to Korean Patent Application No. 10-2015-0022298 filed on Feb. 13, 2015, in the Korean Intellectual Property Office, the entire contents of which are incorporated herein by reference.

BACKGROUND

1. Technical Field

At least some example embodiments of the inventive concepts relate to image technologies, and more particularly, to an apparatus for generating a depth map.

2. Description of the Related Art

Recently, various types of image technologies have been used. A variety of kinds of electronic devices have been widely deployed. Most of electronic devices may perform image processing to display or generate images. For this, most of electronic devices may include a display device, an image capturing device, an image generating device, an image processing device, and the like.

Particularly, a "depth map" is one of image technologies being used in the recent industry. The depth map includes information associated with a distance between an object and an image generating device (e.g., a camera including an image sensor). The depth map may be used to generate a 3-dimensional (3D) image. The 3D image may be used to make movies, video games, and the like be more interesting.

In order to generate a depth map, various types of devices and methods are used. By way of an example, the depth map may be obtained by various methods, such as a method of observing a waveform of light reflected after light having a specific waveform is emitted to an object, a method of measuring time taken for light emitted to an object to return, and a method of obtaining stereo information through two or more cameras. However, in most of the methods for obtaining the depth map, an "additional" sensor or device is required, or "additional" image processing, such as image registration, is needed.

Therefore, although needs for electronic devices having high processing performance increase, as the size of each electronic device is gradually reduced, it is difficult to employ most of the methods for obtaining a depth map for "small" electronic devices being used in the recent industry. In other words, it is necessary to provide a method of obtaining a depth map by using a device or circuit that occupies a small area or bulk.

SUMMARY

At least some example embodiments may provide an image generating device that occupies a small area or bulk and may efficiently generate a depth map. According to some example embodiments, a depth map may be generated without any additional sensor or device. According to at least some example embodiments of the inventive concepts, multiple depth data may be generated through a lens that may move to different positions.

According to at least some example embodiments, an image generating device includes an image sensor including, a plurality of image sensor pixels configured to generate image signals corresponding to an object, and a plurality of phase detection pixels configured to generate first and second phase signals used to calculate a phase difference between images; a lens driver configured to adjust a position of a lens to adjust a distance between the lens and the object; a phase difference calculator configured to, calculate first phase differences based on the first phase signals, the first phase signals being generated when the lens is in a first position, and calculate second phase differences based on the second phase signals, the second phase signals being generated when the lens is in a second position that is different from the first position; and a depth map generator configured to, generate first and second depth data based on the first and second phase differences, respectively, each of the first and second depth data being associated with a distance between the plurality of phase detection pixels and the object, and generate a depth map based on the first and second depth data.

The image generating device may include a phase difference predictor configured to predict values of the second phase differences based on the first phase differences.

The phase difference calculator may be configured to calculate the first phase differences before the second phase differences are calculated as the lens moves from the first position to the second position under a control of the lens driver, the phase difference predictor may be configured to predict the values of the second phase differences before or while the lens moves to the second position.

The depth map generator may be configured such that, when a difference between the values predicted by the phase difference predictor and the second phase differences calculated by the phase difference calculator is greater than a reference value, the depth map generator generates the depth map with reference to the difference.

Each of the plurality of phase detection pixels may correspond to two of the plurality of image sensor pixels.

The plurality of phase detection pixels may be arranged in different positions from the plurality of image sensor pixels such that the plurality of phase detection pixels do not overlapped with the plurality of image sensor pixels.

The image generating device may further include a spatial frequency calculator configured to generate information of a spatial frequency associated with an image where the object is captured, by processing the image signals.

The spatial frequency calculator may be configured to generate first spatial frequency information when the lens is placed in the first position, and generate second spatial frequency information when the lens is placed in the second position.

The spatial frequency calculator may be further configured to obtain at least one of a direction and a quantity of a change in a spatial frequency value when the lens moves from the first position to the second position, based on the first and second spatial frequency information, and the depth map generator may be configured to generate the depth map with reference to at least one of the direction and the quantity of the change in the spatial frequency value.

The image generating device may further include an image sensor chip including the image sensor, the lens driver, the phase difference calculator, and the depth map generator.

According to at least one example embodiment of the inventive concepts, an image generating device includes a phase difference calculator configured to, receive first and second phase signals generated by a plurality of phase detection pixels included in an image sensor, calculate first phase differences based on the first phase signals, the first phase signals being generated when a lens is in a first position, the lens being configured to move in a direction where a distance from an object increases or decreases, and calculate second phase differences based on the second phase signals, the second phase signals being generated when the lens is in a second position that is different from the first position; a lens position controller configured to, calculate an in-focus position of the lens for focusing on the object based on at least one of the first and second phase differences, and generate a lens driving signal to move the lens to the in-focus position; and a depth map generator configured to, generate first and second depth data based on the first and second phase differences respectively, each of the first and second depth data being associated with a distance between the plurality of phase difference pixels and the object, and generate a depth map based on the first and second depth data.

One of the first position and the second position may correspond to the in-focus position.

The image generating device may further include a phase difference predictor configured to predict values of the second phase differences based on the first phase differences; and a spatial frequency calculator configured to generate information of a spatial frequency associated with an image where the object is captured, by processing image signals generated by a plurality of image sensor pixels included in the image sensor.

The image generating device may further include a reliability level calculator configured to calculate a first reliability level associated with the first phase differences and a second reliability level associated with the second phase differences, based on at least one of the values predicted by the phase difference predictor, the second phase differences calculated by the phase difference calculator, and a direction of a change in a spatial frequency value when the lens moves from the first position to the second position.

The depth map generator may be configured to generate the depth map by applying weight values to the first and second depth data based on the first and second reliability levels.

The image generating device may further include a depth map post-processor configured to change a resolution of the depth map by performing image registration on an object image and the depth map, the object image being generated based on image signals that are generated by a plurality of image sensor pixels included in the image sensor.

The image generating device may further include an operation processing device including an application processor, the operation processing device being configured to implement the phase difference calculator, the lens position controller, and the depth map generator.

According to at least some example embodiments of the inventive concepts, an image generating device configured to generate a depth map, the image generating device includes a phase difference calculator configured to calculate first and second phase differences based on first and second phase signals respectively, the first phase signals being generated by a plurality of phase detection pixels when a lens is in a first position, the lens being configured to move in a direction where a distance from an object increases or decreases, the second phase signals being generated by the plurality of phase detection pixels when the lens is in a second position that is different from the first position; and a depth map generator configured to, generate first and second depth data based on the first and second phase differences respectively, each of the first and second depth data being associated with a distance between the plurality of phase detection pixels and the object, and generate the depth map based on the first and second depth data.

The image generating device may further include a phase difference predictor configured to predict values of the second phase differences based on the first phase differences, wherein, the phase difference calculator and the depth map generator are configured such that, when the values predicted by the phase difference predictor are different from the second phase differences calculated by the phase difference calculator, the phase difference calculator calculates third phase differences based on third phase signals, the third phase signals being generated by the plurality of phase detection pixels when the lens is in a third position that is different from the first and second positions; and the depth map generator generates third depth data associated with a distance between the plurality of phase detection pixels and the object based on the third phase differences, and generates the depth map based on the first to third depth data.

The image generating device may further include a spatial frequency calculator configured to, generate first spatial frequency information associated with a first image where the object is captured, by processing first image signals generated by a plurality of image sensor pixels when the lens is placed in the first position, generate second spatial frequency information associated with a second image where the object is captured, by processing second image signals generated by the plurality of image sensor pixels when the lens is placed in the second position, and obtain a direction of a change in a spatial frequency value, based on the first and second spatial frequency information; and a reliability level calculator configured to calculate a first reliability level associated with the first phase differences and a second reliability level associated with the second phase differences, based on the direction where the spatial frequency value is changed, wherein the depth map generator is configured to generate the depth map by applying weight values to the first and second depth data based on the first and second reliability levels.

According to at least one example embodiment of the inventive concepts, an image generating device includes a lens; an image sensor including, a plurality of image sensor pixels configured to generate image signals corresponding to an object, and a plurality of phase detection pixels configured to generate first and second phase signals, a position of the lens being movable with respect to a position of the image sensor; a memory storing computer-readable instructions; and one or more processors configured to execute the instructions to, determine first phase differences based on the first phase signals, the first phase signals being generated based on the lens being located in a first position relative to the image sensor, and determine second phase differences based on the second phase signals, the second phase signals being generated based on the lens being located in a second position relative to the image sensor, generate first and second depth data based on the first and second phase differences, respectively, each of the first and second depth data indicating a distance between the plurality of phase detection pixels and the object, and generate a depth map based on the first and second depth data.

The image generating device may further include a lens driver configured to selectively change the position of the lens relative to the image sensor.

The one or more processors are further configured to predict values of the second phase differences based on the first phase differences.

The one or more processors may be configured to calculate the first phase differences before the second phase differences are calculated as the lens is moved from the first position to the second position under a control of the lens driver, and predict the values of the second phase differences before or while the lens is moved to the second position under the control of the lens driver.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF EMBODIMENTS

Figure 1:
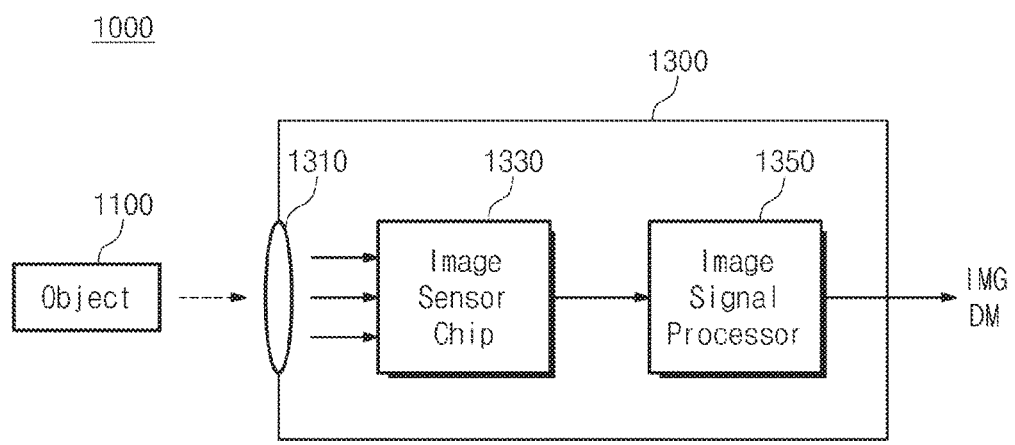
FIG. 1 is a block diagram illustrating an image generating system including an image generating device according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram illustrating an image generating system including an image generating device according to at least one example embodiment of the inventive concepts. Referring to FIG. 1, an image generating system 1000 may include an object 1100 and an image generating device 1300.

The object 1100 is a target to be captured. An image IMG associated with the object 1100 may be generated by an operation of the image generating device 1300.

By way of at least one example embodiment of the inventive concepts, the image generating device 1300 may include a lens 1310, an image sensor chip 1330, and an image signal processor 1350. Herein, the image generating device 1300 may further include other components not shown in FIG. 1. The image generating device 1300 shown in FIG. 1 is only an example to facilitate understanding of at least some example embodiments of the inventive concepts. The image generating device 1300 may generate the image IMG associated with the object 1100.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The lens 1310 may receive light reflected by the object 1100 after being emitted from one or more light sources. By way of at least one example embodiment of the inventive concepts, the image generating device 1300 may include one or more lenses. Light passing through the lens 1310 may be provided to the image sensor chip 1330.

The image sensor chip 1330 may generate one or more image signals based on the light provided from the lens 1310. The image signals may include information used to generate the image IMG associated with the object 1100. The image IMG may be generated based on the image signals. The image signals may be provided to the image signal processor 1350.

For example, the image sensor chip 1330 may include an image sensor pixel. The image sensor pixel may include one or more light pass filters and one or more photo-sensitive sensors. For example, each of the light pass filters may pass one of red light, green light, and blue light, but at least some example embodiments of the inventive concepts are not limited to this instance. Each of the photo-sensitive sensors may generate an electric signal (i.e., an image signal) having an electric characteristic (e.g., a voltage) corresponding to a characteristic (e.g., strength) of the light passing through a respective light pass filter. For example, the one or more light pass filters and the one or more photo-sensitive sensors may be disposed in pixel unit. For example, one image signal may be generated in correspondence to each pixel.

Herein, at least some example embodiments of the inventive concepts are not limited to the above-mentioned examples. A configuration of a light pass filter, the arrangement of a light pass filter and a photo-sensitive sensor, and generation of an image signal may be implemented in various ways. In addition, For example, the image sensor chip 1330 may further include various components, such as an infrared light pass filter and an infrared light sensor.

Moreover, according to at least some example embodiments of the inventive concepts, the image sensor chip 1330 may further include a phase detection pixel. The phase detection pixel may be used to perform "phase difference auto-focusing". The phase detection pixel may generate a phase signal. The phase signal may be used to calculate a phase difference between image signals. According to at least some example embodiments of the inventive concepts, the phase difference may be used to focus on an object and to measure a distance between an object and an image sensor. The phase detection pixel will be further described with reference to FIGS. 2 to 6.

The image signal processor 1350 may receive image signals and phase signals that are generated by the image sensor chip 1330. The image signal processor 1350 may perform operations for processing the image signals. The image IMG associated with the object 1100 may be generated based on the image signals. However, the image signals may not be appropriate for generating the image IMG. In order to generate the appropriate image IMG, the image signal processor 1350 may perform image signal processing.

For example, the image signal processor 1350 may perform image signal processing, such as bad pixel correction, demosaicing, noise reduction, lens shading correction, gamma correction, and edge enhancement. However, at least some example embodiments of the inventive concepts are not limited to the above examples. The image signal processor 1350 may further perform other types of image signal processing.

The image signal processor 1350 may focus on the object 1100 by processing the phase signals. In addition, according to at least some example embodiments of the inventive concepts, the image signal processor 1350 may generate a depth map DM by processing the phase signals. The depth map DM may be an image showing information associated with a distance between the object 1100 and an image sensor. It has been described that the image signal processor 1350 performs processing the phase signals, focusing, and generating the depth map DM. However, as will be described below, at least one of processing the phase signals, focusing, generating the depth map DM, and any combination thereof may be performed by the image sensor chip 1330.

The image signal processor 1350 may be implemented in hardware. For example, the image signal processor 1350 may include analog circuits or logic circuits for performing image signal processing. Alternatively, the image signal processor 1350 may be implemented in an operation processing unit. For example, the image signal processor 1350 may be implemented in an operation processing device that includes an application processor. The operation processing device may perform image signal processing by executing an instruction code stored in a read-only memory (ROM) or a program code loaded into a random access memory (RAM). However, at least some example embodiments of the inventive concepts are not limited to these examples.

According to at least one example embodiment of the inventive concepts, as shown in FIG. 1, the image signal processor 1350 may be included together with the image sensor chip 1330 in the same device. In at least the example shown in FIG. 1, the image generating device 1300 may be implemented in a portable electronic device, such as a digital camera, a smart phone, a tablet, and a wearable device, including the image sensor chip 1330 and the image signal processor 1350.

According to at least another example embodiment of the inventive concepts, unlike FIG. 1, the image signal processor 1350 and the image sensor chip 1330 may be provided in separate devices, respectively. In at least the present example embodiment, For example, the device including the image sensor chip 1330 may be just an image capturing device, and the device including the image signal processor 1350 may be a computing device including one or more processors. In other words, at least one example embodiment of the inventive concepts may be implemented in various ways, and at least some example embodiments of the inventive concepts are not limited to the configuration shown in FIG. 1.

According to at least one example embodiment of the inventive concepts, as shown in FIG. 1, the image signal processor 1350 may be an image signal processing circuit, an image signal processing chip, or an image signal processing device that is separately provided from the image sensor chip 1330. In at least the example shown in FIG. 1, when the image generating device 1300 is a portable electronic device, the image sensor chip 1330 may be separately provided from the image signal processor 1350, and the image signal processor 1350 may be included in an application processor.

According to at least one other example embodiment of the inventive concepts, According to at least another example embodiment of the inventive concepts, unlike FIG. 1, the image signal processor 1350 may be partly or entirely included in the image sensor chip 1330. In this example embodiment, the image sensor chip 1330 may generate an image signal as well as performing image signal processing. In other words, at least one example embodiment of the inventive concepts may be implemented with various configurations, and at least some example embodiments of the inventive concepts are not limited to the configuration shown in FIG. 1. FIG. 1 illustrates just an example configuration to facilitate understanding of at least some example embodiments of the inventive concepts.

Components of an "image generating device" according to an any example embodiment of, or alternatively, at least some example embodiments of, the inventive concepts that are described below may be implemented in one of the image sensor chip 1330 and the image signal processor 1350, or may be implemented to be divided into the image sensor chip 1330 and the image signal processor 1350. Alternatively, the components of the "image generating device" may be separately provided from both the image sensor chip 1330 and the image signal processor 1350. At least some example embodiments of the inventive concepts may be implemented with various configurations. Configurations according to at least some example embodiments of the inventive concepts will be described with reference to FIGS. 7 to 17.

Figure 2:
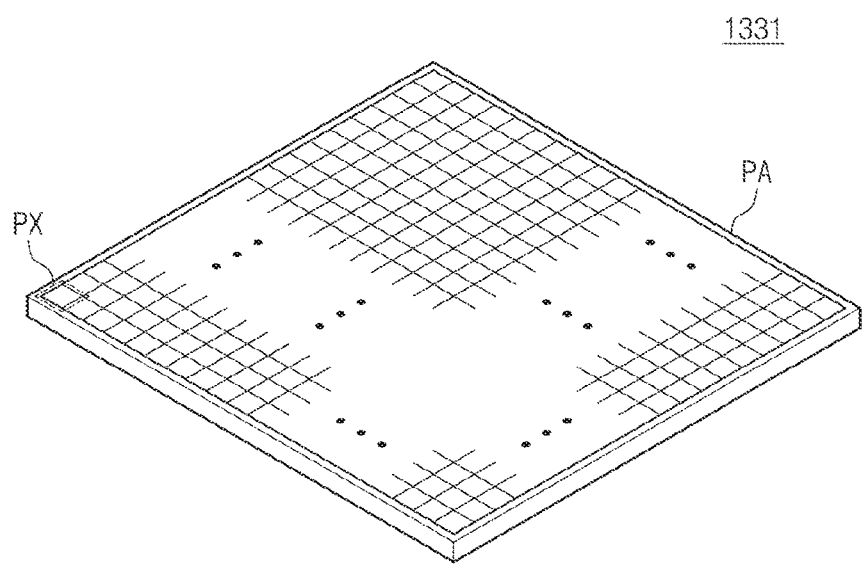
FIGS. 2 to 4 are conceptual diagrams illustrating an image sensor including a phase detection pixel according to at least one example embodiment of the inventive concepts.
Figure 3:
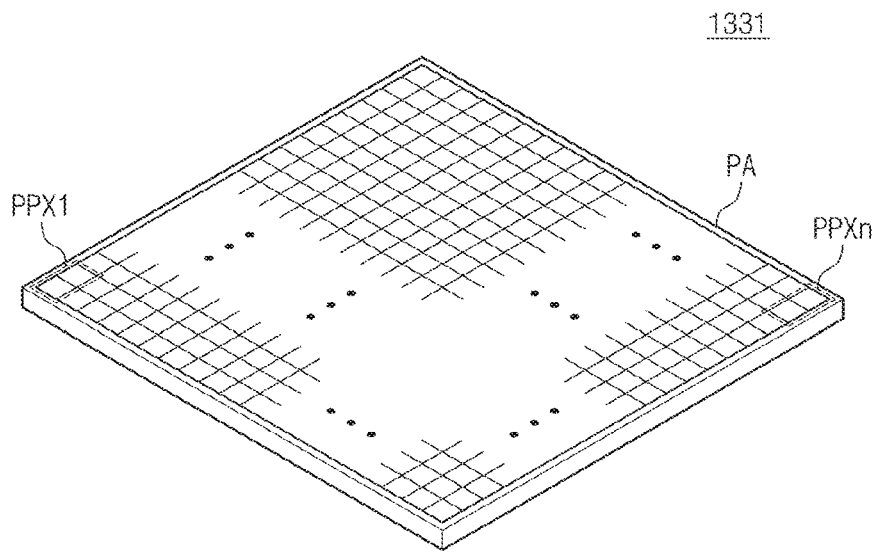
Figure 4:
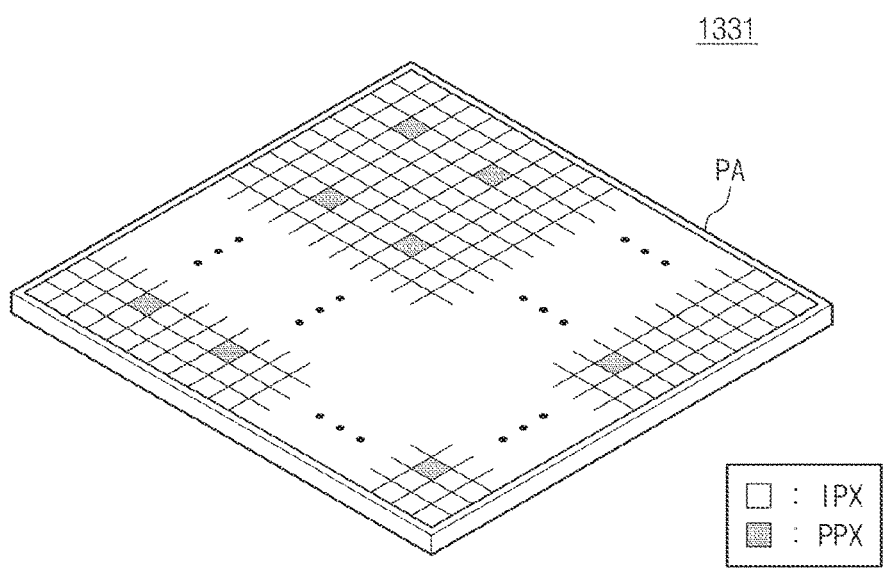

FIGS. 2 to 4 are conceptual diagrams illustrating an image sensor including a phase detection pixel according to at least one example embodiment of the inventive concepts. An image sensor 1331 including a phase detection pixel according to at least one example embodiment of the inventive concepts may be included in an image sensor chip 1330 of FIG. 1.

Referring to FIG. 2, the image sensor 1331 may include a pixel array PA. The pixel array PA may be formed by pixel unit PX. The image sensor 1331 may include a plurality of image sensor pixels and a plurality of phase detection pixels. The plurality of image sensor pixels may generate image signals corresponding to an object. The plurality of phase detection pixels may generate phase signals used to calculate a phase difference between images. The plurality of image sensor pixels and the plurality of phase detection pixels may be arranged by pixel unit PX. The arrangement of the plurality of image sensor pixels and the plurality of phase detection pixels will be described in greater detail below with reference to FIGS. 3 and 4.

According to at least one example embodiment of the inventive concepts, each of the plurality of phase detection pixels may be configured to correspond to two of the plurality of image sensor pixels. Referring to FIGS. 2 and 3, each of the plurality of image sensor pixels may correspond to one pixel unit PX. In addition, each of a plurality of phase detection pixels PPX1 to PPXn may correspond to two pixel units. In other words, For example, two image sensor pixels may be used as one phase detection pixel PPX1. In this example embodiment, one pixel unit PX may be used as a phase detection pixel as well as an image sensor pixel.

In the above example embodiment, all pairs of image sensor pixels may be used as singe phase detection pixels. Alternatively, some of the plurality of image sensor pixels may not be used as any phase detection pixel. For example, when the number of the plurality of image sensor pixels is "p", the number of the plurality of phase detection pixels may be equal to or less than (p/2) (i.e., n≤(p/2)).

According to at least another example embodiment of the inventive concepts, the plurality of phase detection pixels may be arranged such that the plurality of phase detection pixels do not overlap with the plurality of image sensor pixels. Referring to FIG. 4, a white quadrangular shape represents an image sensor pixel IPX, and a shaded quadrangular shape represents a phase detection pixel PPX. In other words, the plurality of phase detection pixels may be arranged in different positions from those of the plurality of image sensor pixels. In at least the example shown in FIG. 4, the phase detection pixels may not be used as image sensor pixels. For example, each of the phase detection pixels may include a white light sensor, but at least some example embodiments of the inventive concepts are not limited thereto.

In the above example embodiment, some of pixels included in the pixel array PA may be used as image sensor pixels. In addition, pixels not being used as the image sensor pixels may be used as phase detection pixels. According to at least some example embodiments of the inventive concepts, all the pixels included in the pixel array PA may be used as phase detection pixels.

In an example embodiment, various modifications or corrections may be made on configurations of phase detection pixels, the number of the phase detection pixels, the arrangement of the phase detection pixels, and/or the positions of the phase detection pixels. FIGS. 2 to 4 just illustrate some of possible configurations of the image sensor 1331 including the plurality of phase detection pixels, and at least some example embodiments of the inventive concepts are not limited thereto. The image sensor 1331 may be implemented to be different from configurations shown in FIGS. 2 to 4.

Figure 5:
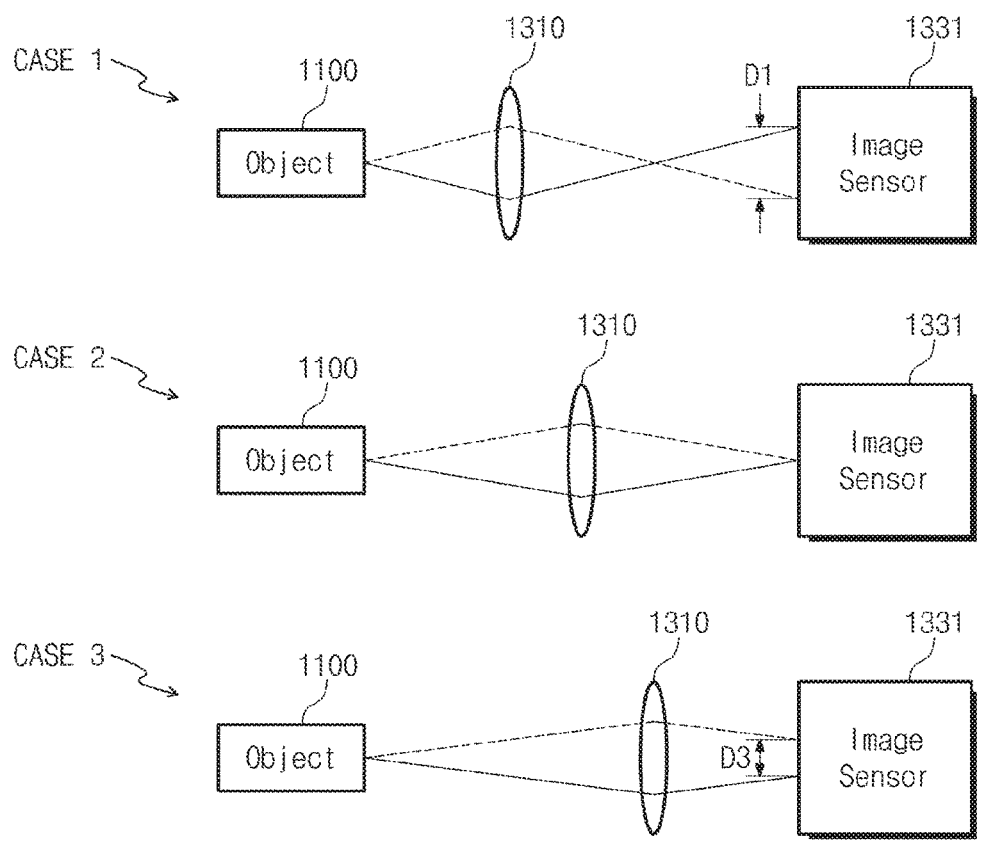
FIGS. 5 and 6 are conceptual diagrams illustrating a process of using a phase detection pixel.
Figure 6:
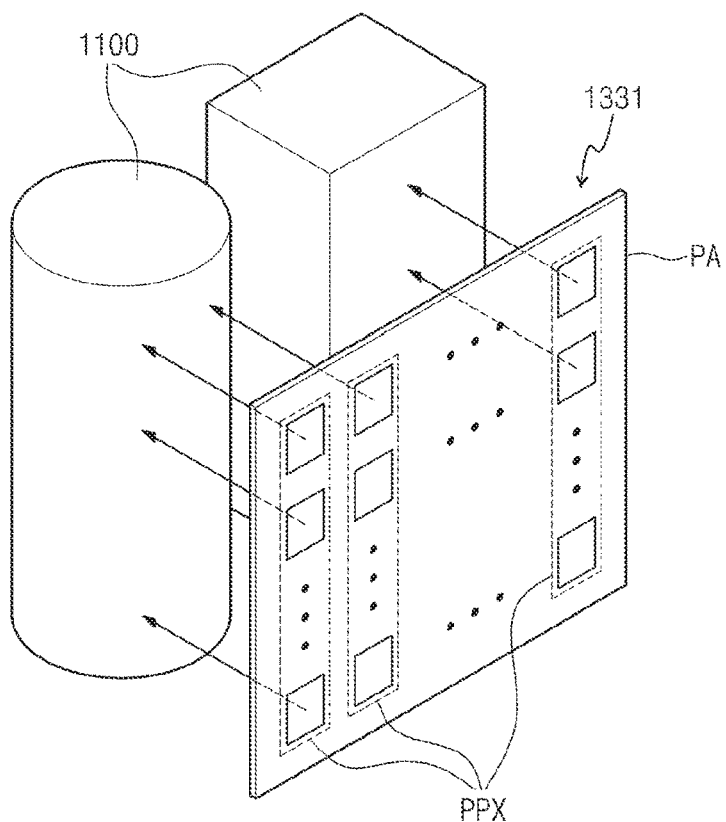

FIGS. 5 and 6 are conceptual diagrams illustrating a process of using a phase detection pixel. For example, a lens 1310 included in an image generating device 1300 (refer to FIG. 1) may be configured to be movable. In more detail, the lens 1310 may move in a direction where a distance from an object 1100 increases or decreases. According to this, a distance between the lens 1310 and the object 1100 may be adjusted. The object 1100 may be focused or defocused according to a position of the lens 1310.

First, FIG. 5 will be referred. Referring to a first case CASE 1, a distance between the lens 1310 and the object 1100 is relatively close. In the first case CASE 1, the lens 1310 gets out of an "in-focus position". The in-focus position is a position of the lens 1310 for focusing on the object 1100. Because the lens 1310 gets out of the in-focus position, a phase difference D1 may occur between images formed on the image sensor 1331 included in the image sensor chip 1330. Accordingly, in the first case CASE 1, the object 1100 may be defocused.

Referring to a second case CASE 2, the lens 1310 is placed on the in-focus position. When the lens 1310 is placed on the in-focus position, a phase difference between images formed on the image sensor 1331 may be zero (0). Accordingly, in the second case CASE 2, the object 110 may be focused.

Referring to a third case CASE 3, a distance between the lens 1310 and the object 1100 is relatively distant. In the third case CASE 3, the lens 1310 gets out of the in-focus position. Because the lens 1310 gets out of the in-focus position, a phase difference D3 may occur between images formed on the image sensor 1331. Therefore, in the third case CASE 3, the object 1100 may be defocused.

A plurality of phase detection pixels included in the image sensor 1331 may be used to focus on an object. As described above, the plurality of phase detection pixels may generate phase signals. The phase signals may include information associated with positions of images formed on the image sensor 1331. Accordingly, the phase signals may be used to calculate phase differences between images. The in-focus position of the lens 1310 may be calculated based on the calculated phase differences. For example, a position of the lens 1310 where a phase difference is 0 may be the in-focus position.

According to at least some example embodiments of the inventive concepts, the plurality of phase detection pixels may be used to focus on the object 1100 and may also be used to measure a distance between the object 1100 and the image sensor 1331. For example, in order to measure a distance between the object 1100 and the image sensor 1331, additional information, such as phase differences between images formed on the image sensor 1331, a distance between the lens 1310 and the image sensor 1331, a size of the lens 1310, and the in-focus position of the lens 1310, may be referenced.

For example, information associated with a distance between the object 1100 and the image sensor 1331, corresponding to specific conditions such as a specific in-focus position and a specific phase difference, may be prepared in advance. The image generating device 1300 may store information of specific conditions and the prepared information, For example, in a form of a look-up table. According to at least one example embodiment of the inventive concepts, the look-up table may be stored in memory included in the image generating device. For example, the look-up table may indicate the correspondence relationship between the specific conditions and the prepared information. The image generating device 1300 may calculate conditions such as an in-focus position and a phase difference, and then may obtain a distance between the object 1100 and the image sensor 1331, corresponding to the calculated conditions, with reference to the stored information.

As another example, the image generating device 1300 may calculate conditions such as a phase difference and a distance between the lens 1310 and the image sensor 1331. The image generating device 1300 may perform mathematical calculation (e.g., trigonometric function calculation using lengths of sides and angles formed by sides, and the like) with respect to the calculated conditions. Based on the mathematical calculation, the image generating device 1300 may calculate a distance between the object 1100 and the image sensor 1331.

According to the above-mentioned examples, an absolute distance between the object 1100 and the image sensor 1331 may be calculated by the image generating device 1300 (e.g., using the image sensor chip 1330 and/or the image signal processor 1350). On the other hand, when additional information is not sufficiently prepared, a relative distance between the object 1100 and the image sensor 1331 may be calculated based on the phase difference information. A depth map showing information associated with a distance between the object 1100 and the image sensor 1331 may be generated based on the absolute distance or the relative distance between the object 1100 and the image sensor 1331.

Herein, the above-mentioned examples are just provided to facilitate understanding of at least some example embodiments of the inventive concepts, and at least some example embodiments of the inventive concepts are not limited thereto. A distance between the object 1100 and the image sensor 1331 may be calculated by various processing. In particular, when additional information, such as phase differences between images formed on the image sensor 1331, a distance between the lens 1310 and the image sensor 1331, a size of the lens 1310, and the in-focus position of the lens 1310, are used, the more accurate absolute distance may be calculated.

Reference is now made to FIG. 6. When a distance between the object 1100 and the image sensor 1331 is calculated, the image generating device 1300 may generate a depth map. As described above, a pixel array PA of the image sensor 1331 may include a plurality of phase detection pixels PPX. According to at least some example embodiments of the inventive concepts, a depth map of the entire portion of the object 1100 may be generated by the plurality of phase detection pixels PPX. For example, according to at least some example embodiments of the inventive concepts, a distance between the entire portion of the object 1100 and the image sensor 1331 may be calculated, instead of just calculating a distance between one point or some relatively small portion of the object 1100 and the image sensor 1331. Therefore, the image generating device 1300 may generated the depth map of the entire portion of the object 1100.

Herein, FIG. 6 is an example conceptual diagram to facilitate understanding of at least some example embodiments of the inventive concepts, and is not intended to limit at least some example embodiments of the inventive concepts. As described above, the phase detection pixels may be implemented with various forms. Various modifications or corrections may be made on configurations of the phase detection pixels, the number of the phase detection pixels, the arrangement of the phase detection pixels, and the positions of the phase detection pixels.

Figure 7:
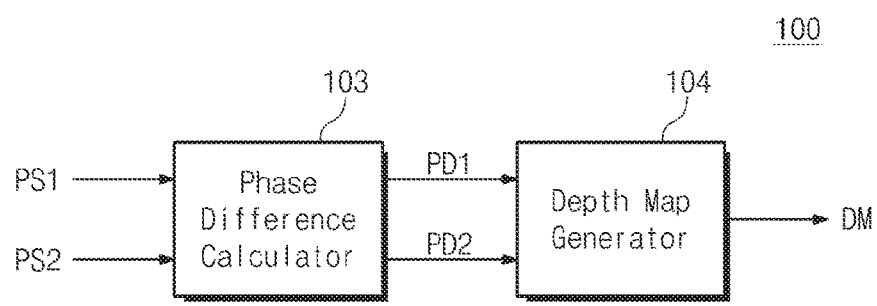
FIG. 7 is a block diagram illustrating an image generating device according to at least one example embodiment of the inventive concepts.
Figure 8:
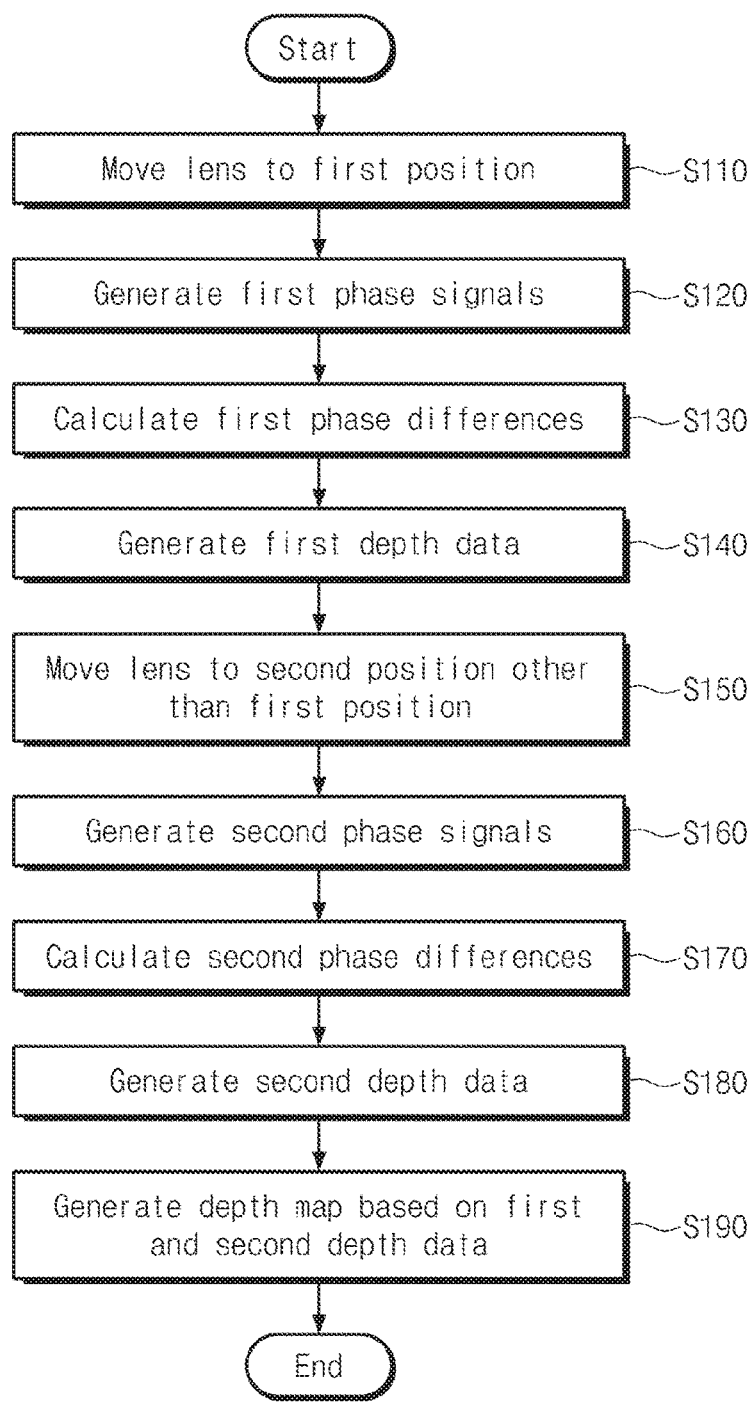
FIG. 8 is a flowchart describing an operation of an image generating device of FIG. 7.
Figure 9:
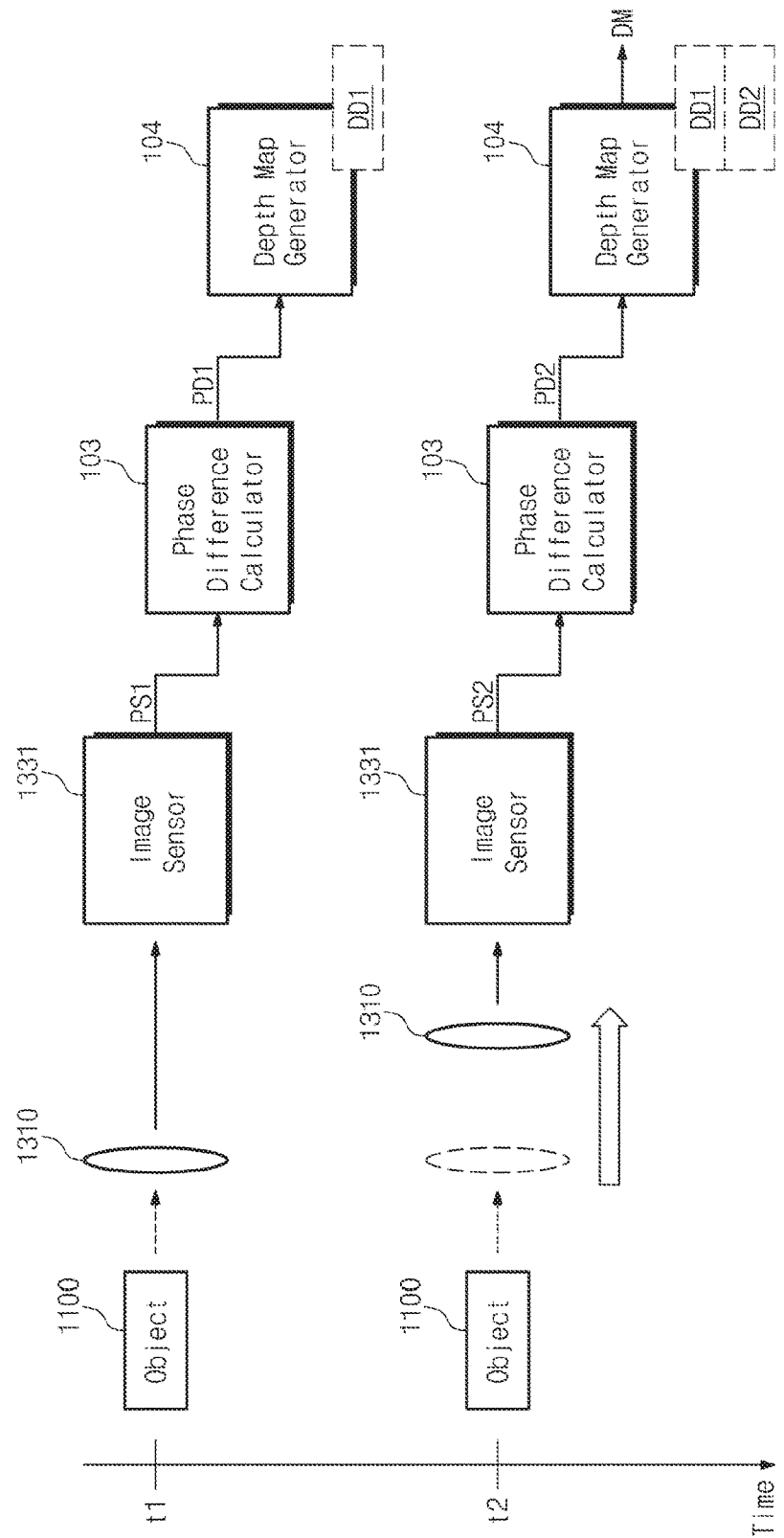
FIG. 9 is a conceptual diagram illustrating an operation of an image generating device of FIG. 7.

FIG. 7 is a block diagram illustrating an image generating device according to at least one example embodiment of the inventive concepts. FIG. 8 is a flowchart describing an operation of an image generating device of FIG. 7. FIG. 9 is a conceptual diagram illustrating an operation of an image generating device of FIG. 7.

Referring to FIG. 7, an image generating device 100 may include a phase difference calculator 103 and a depth map generator 104. The image generating device 100 may generate a depth map DM according to at least one example embodiment of the inventive concepts.

According to at least one example embodiment of the inventive concepts, the image generating device 100 may include or be implemented by one or more circuits or circuitry (e.g., hardware) specifically structured to carry out some or all of the operations described herein as being performed by the image generating device 100 (or an element thereof). According to at least one example embodiment of the inventive concepts, the image generating device 100 may include or be implemented by a memory and one or more processors executing computer-readable code (e.g., software) that is stored in the memory and includes instructions corresponding to some or all of the operations described herein as being performed by the image generating device 100 (or an element thereof). According to at least one example embodiment of the inventive concepts, the image generating device 100 may be implemented by, for example, a combination of the above-referenced hardware and processors executing computer-readable code.

For example, the image generating device 100 may be implemented by the image sensor chip 1130 and/or image signal processor 1350 of FIG. 1.

To describe at least one example embodiment of the inventive concepts, reference is now made to FIGS. 7 to 9 together.

In operation S110 of FIG. 8, a lens 1310 of FIG. 9 may move to a first position. As described above, the lens 1310 may move in a direction where a distance from an object 1100 of FIG. 9 increases or decreases. According to this, a distance between the lens 1310 and the object 1100 may be adjusted. At time "t1" of FIG. 9, the lens 1310 may move to the first position in response to a lens position control signal. For example, the first position may be a fixed position. Alternatively, the first position may be an adjustable position. The first position may be selected or determined in various ways.

In operation S120 of FIG. 8, first phase signals PS1 may be generated. When the lens 1310 is placed in the first position, the object 1100 may be captured. An image sensor 1331 of FIG. 9 may receive light reflected from the object 1100 through the lens 1310. A plurality of phase detection pixels included in the image sensor 1331 may generate the first phase signals PS1, for example, based on the reflected light. The first phase signals PS1 may include information associated with positions of images that are formed on the image sensor 1331 when the lens 1310 is placed in the first position.

In operation S130 of FIG. 8, first phase differences PD1 may be calculated. The phase difference calculator 103 may receive the first phase signals PS1 from the image sensor 1331. The phase difference calculator 103 may calculate the first phase differences PD1 based on the first phase signals PS1. The first phase differences PD1 may be phase differences associated with the images that are formed on the image sensor 1331 when the lens 1310 is placed in the first position.

In operation S140 of FIG. 8, first depth data DD1 may be generated. The first depth data DD1 may be data associated with a distance between the plurality of phase detection pixels of the image sensor 1331 and the object 1100. The depth map generator 104 may receive the first phase differences PD1 from the phase difference calculator 103. The depth map generator 104 may generate the first depth data DD1 based on the first phase differences PD1. For example, the depth map generator 104 may generate the first depth data DD1 with reference to additional information, such as a distance between the lens 1310 and the image sensor 1331, a size of the lens 1310, and an in-focus position of the lens 1310, as well as the first phase differences PD1.

For example, a depth map DM may be generated based on only the first depth data DD1. However, there is possibility that the first depth data DD1 includes inaccurate distance data, depending on an environment where the object 1100 is captured. When the first depth data DD1 includes the inaccurate distance data, the depth map DM may not be accurately generated. Thus, according to at least some example embodiments of the inventive concepts, another depth data may be further generated to generate the depth map DM having higher reliability.

In operation S150 of FIG. 8, the lens 1310 may move to a second position. The second position is different from the first position. At time "t2" of FIG. 9, the lens 1310 may move to the second position in response to the lens position control signal. For example, the second position may be a fixed position or an adjustable position. The second position may be selected or determined in various ways.

According to at least one example embodiment of the inventive concepts, one of the first position and the second position may correspond to the in-focus position. According to at least the present example embodiment of the inventive concepts, information associated with the in-focus position of the lens 1310 may be obtained together with the generating the depth data. However, at least some example embodiments of the inventive concepts are not limited to the above example embodiment. Each of the first position and the second position may be an arbitrary position other than the in-focus position.

Referring to FIG. 9, when the lens 1310 moves from the first position to the second position, a distance between the lens 1310 and the image sensor 1331 may become close. However, at least some example embodiments of the inventive concepts are not limited to FIG. 9. In some other example embodiments, when the lens 1310 moves from the first position to the second position, a distance between the lens 1310 and the image sensor 1331 may become distant. FIG. 9 illustrates an example to facilitate understanding of at least some example embodiments of the inventive concepts.

In operation S160 of FIG. 8, second phase signals PS2 may be generated. When the lens 1310 is placed in the second position, the object 1100 may be captured. The image sensor 1331 may receive light reflected from the object 1100 through the lens 1310. The plurality of phase detection pixels included in the image sensor 1331 may generate the second phase signals PS2. The second phase signals PS2 may include information associated with positions of images formed on the image sensor 1331 when the lens 1310 is placed in the second position.

In operation S170 of FIG. 8, second phase differences PD2 may be calculated. The phase difference calculator 103 may receive the second phase signals PS2 from the image sensor 1331. The phase difference calculator 103 may calculate the second phase differences PD2 based on the second phase signals PS2. The second phase differences PD2 may be phase differences associated with the images formed on the image sensor 1331 when the lens 1310 is placed in the second position.

In operation S180 of FIG. 8, second depth data DD2 may be generated. The second depth data DD2 may be data associated with a distance between the plurality of phase detection pixels of the image sensor 1331 and the object 1100. The depth map generator 104 may receive the second phase differences PD2 from the phase difference calculator 103. The depth map generator 104 may generate the second depth data DD2 based on the second phase differences PD2. For example, the depth map generator 104 may generate the second depth data DD2 with reference to additional information, such as a distance between the lens 1310 and the image sensor 1331, a size of the lens 1310, and the in-focus position of the lens 1310, as well as the second phase differences PD2.

In operation S190 of FIG. 8, the depth map DM may be generated. The depth map DM may be generated based on the first depth data DD1 and the second depth data DD2. The depth map generator 104 may generate the depth map DM based on the first depth data DD1 and the second depth data DD2.

As described above, there is possibility that the first depth data DD1 includes inaccurate distance data. Accordingly, according to at least some example embodiments of the inventive concepts, the depth map generator 104 may further generate the second depth data DD2. When multiple depth data DD1 and DD2 are referred, inaccurate distance data (i.e., an error) included in the first depth data DD1 or the second depth data DD2 may be corrected. The image generating device 100 according to at least one example embodiment of the inventive concepts may generate the depth map DM having higher reliability with reference to the multiple depth data DD1 and DD2. The process of generating the depth map DM with reference to the first depth data DD1 and the second depth data DD2 will be further described with reference to FIGS. 13 to 17.

Referring to FIGS. 7 to 9, it is described that the lens 1310 moves to the first position and the second position and the two depth data DD1 and DD2 are generated. However, in order to more accurately generate the depth map DM, three or more lens positions and three or more depth data may be used. FIGS. 7 to 9 are just examples to facilitate understanding of at least some example embodiments of the inventive concepts, and at least some example embodiments of the inventive concepts are not limited thereto.

In addition, referring to FIGS. 7 to 9, it is described that the lens 1310 moves to the second position after the processes performed when the lens 1310 is placed in the first position are completed. However, the order of performing the processes according to at least one example embodiment of the inventive concepts may be changed or modified according to a design of the image generating device 100.

For example, the lens 1310 may move to the second position while or before the first phase signals PS1, the first phase differences PD1, or the first depth data DD1 is generated. For example, the phase difference calculator 103 may concurrently calculate the first phase differences PD1 and the second phase differences PD2, or may calculate the second phase differences PD2 earlier than the first phase differences PD1. For example, the depth map generator 104 may concurrently generate the first depth data DD1 and the second depth data, or may generate the second depth data DD2 earlier than the first depth data DD1.

According to at least some example embodiments of the inventive concepts, it is sufficient that the image generating device 100 generates the depth map DM based on the several depth data DD1 and DD2. The order of performing the processes described with reference to FIGS. 7 to 9 may be variously changed or modified. At least some example embodiments of the inventive concepts are not limited to the descriptions with reference to FIGS. 7 to 9.

The image generating device 100 according to at least one example embodiment of the inventive concepts does not require additional devices such as a time-of-flight (ToF) sensor, an infrared sensor, and a stereo camera. Accordingly, the image generating device 100 according to at least one example embodiment of the inventive concepts may generate the depth map DM while occupying a small area or bulk. In addition, according to at least some example embodiments of the inventive concepts, the image generating device 100 may generate the depth map DM having higher reliability by correcting an error with reference to the multiple depth data DD1 and DD2.

Figure 10:
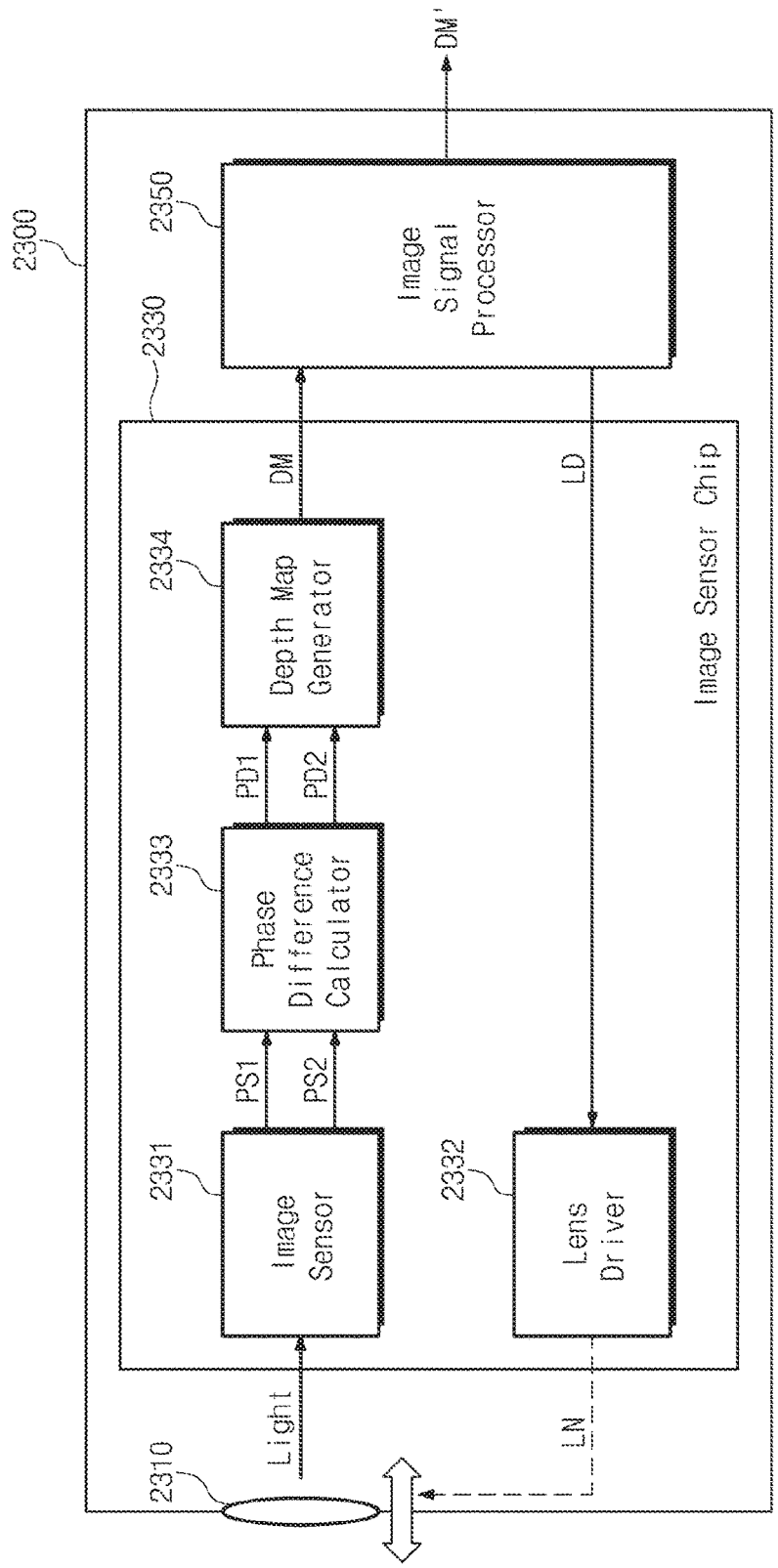
FIGS. 10 to 17 are block diagrams illustrating image generating devices according to at least some example embodiments of the inventive concepts.

FIG. 10 is a block diagram illustrating an image generating device according to at least one example embodiment of the inventive concepts. Referring to FIG. 10, an image generating device 2300 may include a lens 2310, an image sensor chip 2330, and an image signal processor 2350. In addition, the image sensor chip 2330 may include an image sensor 2331, a lens driver 2332, a phase difference calculator 2333, and a depth map generator 2334.

Configurations and functions of the lens 2130 may include those of the lens 1310, which have been described with reference to FIGS. 1 to 9. Redundant descriptions associated with the lens 2310 will be omitted below for brevity of the description. Light passing through the lens 2310 may be provided to the image sensor 2331 of the image sensor chip 2330.

The image sensor 2331 may include a plurality of image sensor pixels and a plurality of phase detection pixels. The plurality of image sensor pixels may generate image signals corresponding to an object. The plurality of phase detection pixels may generate first phase signals PS1 and second phase signals PS2 that are used to calculate phase differences between images. The first phase signals PS1 may be generated when the lens 2310 is placed in a first position, and the second phase signals PS2 may be generated when the lens 2310 is placed in a second position.

Configurations and functions of the image sensor 2331 may include those of the image sensor 1331, which have been described with reference to FIGS. 1 to 9. Redundant descriptions associated with the image sensor 2331 will be omitted below for brevity of the description.

The lens driver 2332 may generate a lens position control signal LN. The lens position control signal LN may be a signal used to adjust a position of the lens 2310. In response to the lens position control signal LN, the lens 2310 may move along a direction where a distance from the object increases or decreases. According to this, a distance between the lens 2310 and the object may be adjusted. For example, the lens driver 2332 may generate the lens position control signal LN based on a lens driving signal LD provided from the image signal processor 2350. However, unlike FIG. 10, in some other example embodiments, the lens driver 2332 may generate the lens position control signal LN by performing an operation for controlling a position of the lens 2310 without the lens driving signal LD.

The phase difference calculator 2333 may calculate first phase differences PD1 and second phase differences PD2 based on the first phase signals PS1 and the second phase signals PS2, respectively. The depth map generator 2334 may generate a depth map DM based on the first phase differences PD1 and the second phase differences PD2.

Configurations and functions of the phase difference calculator 2333 and the depth map generator 2334 may include those of the phase difference calculator 103 and the depth map generator 104, which have been described with reference to FIGS. 7 to 9 (e.g., with reference to the image generating device 100). Redundant descriptions associated with the phase difference calculator 2333 and the depth map generator 2334 will be omitted below for brevity of the description.

In an example embodiment, the image signal processor 2350 may perform image signal processing on the depth map DM generated by the depth map generator 2334. Accordingly, the image signal processor 2350 may generate a depth map DM' that is more appropriately processed. However, unlike FIG. 10, in at least another example embodiment of the inventive concepts, the depth map DM generated by the depth map generator 2334 may be directly output from the image generating device 2300 without the image signal processing.

In an example embodiment, the image signal processor 2350 may generate the lens driving signal LD for controlling the lens driver 2332. However, unlike FIG. 10, in at least another example embodiment of the inventive concepts, the image signal processor 2350 may directly control a position of the lens 2310 without the lens driver 2332. In other words, FIG. 10 illustrates an example configuration to facilitate understanding of at least some example embodiments of the inventive concepts, and is not intended to limit at least some example embodiments of the inventive concepts. At least one example embodiment of the inventive concepts may be implemented with a different configuration from the configuration shown in FIG. 10.

Configurations and functions of the image signal processor 2350 may include those of the image signal processor 1350 of FIG. 1. Redundant descriptions associated with the image signal processor 2350 will be omitted below for brevity of the description.

According to an example embodiment of FIG. 10, the phase difference calculator 2333 and the depth map generator 2334 may be implemented in the image sensor chip 2330. According to at least one example embodiment of the inventive concepts, the image sensor 2331, the lens driver 2332, the phase difference calculator 2333, and the depth map generator 2334 may be implemented in one image sensor chip 2330.

However, at least some example embodiments of the inventive concepts are not limited to the configurations shown in FIG. 10. The image generating device 2300 may further include other components not shown in FIG. 10, or may not include one or more components shown in FIG. 10. FIG. 10 illustrates just an example configuration of the image generating device 2300.

Figure 11:
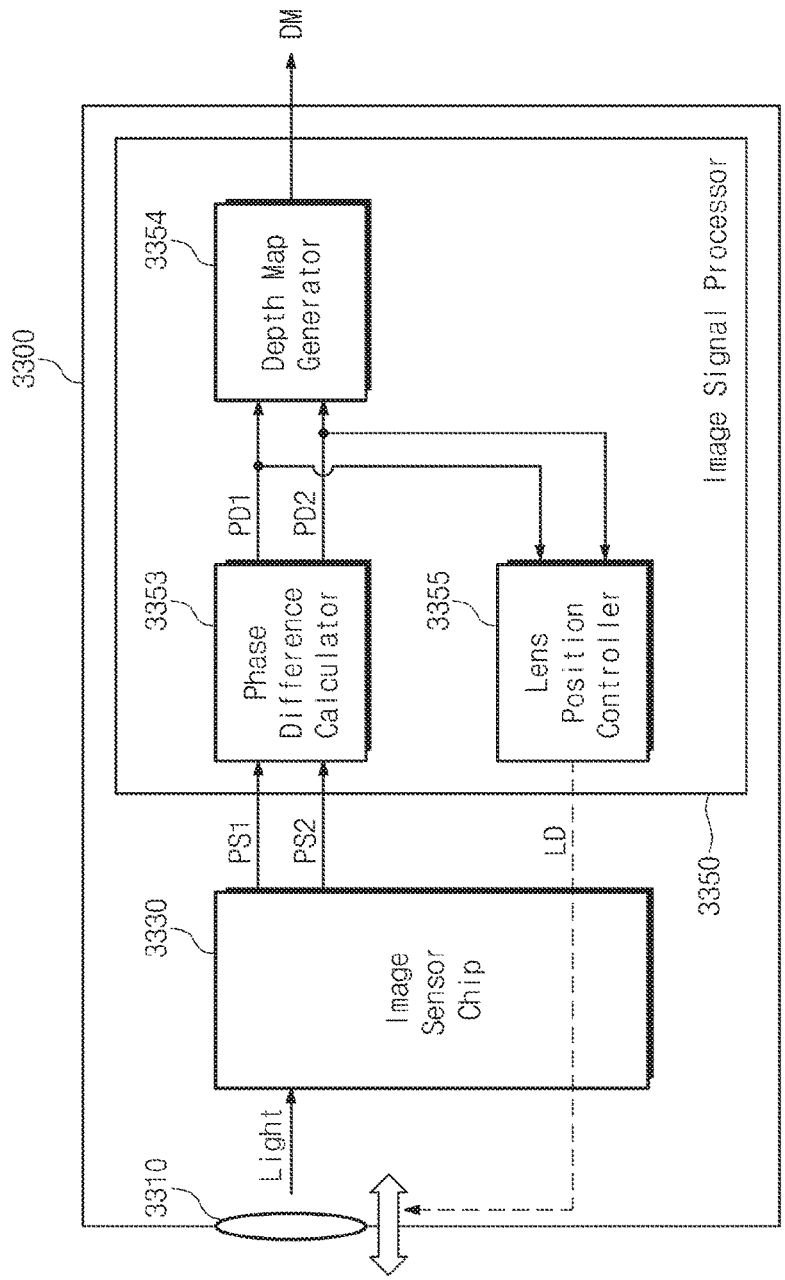

FIG. 11 is a block diagram illustrating an image generating device according to at least one example embodiment of the inventive concepts. Referring to FIG. 11, an image generating device 3300 may include a lens 3310, an image sensor chip 3330, and an image signal processor 3350. In addition, the image signal processor 3350 may include a phase difference calculator 3353, a depth map generator 3354, and a lens position controller 3355.

Configurations and functions of the lens 3310 may include those of the lens 1310, which have been described with reference to FIGS. 1 to 9. Redundant descriptions associated with the lens 3310 will be omitted below for brevity of the description. Light passing through the lens 3310 may be provided to the image sensor chip 3330.

The image sensor chip 3330 may include an image sensor 1331 (refer to FIGS. 2 to 6). The image sensor 1331 may include a plurality of image sensor pixels and a plurality of phase detection pixels. The plurality of image sensor pixels may generate image signals corresponding to an object. The plurality of phase detection pixels may generate first phase signals PS1 and second phase signals PS2 that are used to calculate phase differences between images. The first phase signals PS1 may be generated when the lens 2310 is placed in a first position, and the second phase signals PS2 may be generated when the lens 2310 is placed in a second position. The configurations and functions of the image sensor 1331 have been described with reference to FIGS. 1 to 9.

The phase difference calculator 3353 may receive the first phase signals PS1 and the second phase signals PS2 from the image sensor chip 3330. The phase difference calculator 3353 may calculate first phase differences PD1 and second phase differences PD2 based on the first phase signals PS1 and the second phase signals PS2, respectively. The depth map generator 3354 may generate a depth map DM based on the first phase differences PD1 and the second phase differences PD2.

Configurations and functions of the phase difference calculator 3353 and the depth map generator 3354 may include those of the phase difference calculator 103 and the depth map generator 104, which have been described with reference to FIGS. 7 to 9 (e.g., with reference to the image generating device 100). Redundant descriptions associated with the phase difference calculator 3353 and the depth map generator 3354 will be omitted below for brevity of the description.

The lens position controller 3355 may generate a lens driving signal LD. The lens driving signal LD may be a signal used to move the lens 3310. In response to the lens driving signal LD, the lens 3310 may move along a direction where a distance from the object increases or decreases. According to this, a distance between the lens 3310 and the object may be adjusted. However, unlike FIG. 11, the lens position controller 3355 may not directly control a position of the lens 3310. For example, the lens position controller 3355 may indirectly control a position of the lens 3310 by controlling another component (e.g., the lens driver 2332 of FIG. 10).

In an example embodiment, the lens position controller 3355 may calculate an in-focus position of the lens 3310. As described above, the in-focus position may be a position of the lens 3310 for focusing on an object. The lens position controller 3355 may calculate the in-focus position based on the first phase differences PD1 and/or the second phase differences PD2. For example, the lens position controller 3355 may calculate and determine a position of the lens 3310 where a phase difference is 0 as the in-focus position. When the lens 3310 needs to move to the in-focus position, the lens position controller 3355 may generate the lens driving signal LD to move the lens 3310 to the in-focus position.

However, unlike the above descriptions, in at least another example embodiment of the inventive concepts, the in-focus position may be calculated by the image sensor chip 3330. When the image sensor chip 3330 includes a separate lens position controller, the image sensor chip 3330 may generate a lens driving signal for moving the lens 3310 to the calculated in-focus position. At least one example embodiment of the inventive concepts may be changed or modified to a different configuration from that shown in FIG. 11.

According to at least some example embodiments of the inventive concepts, the image signal processor 3350 may perform various types of image signal processing on the depth map DM generated by the depth map generator 3354. According to this, a depth map DM that is more appropriately processed may be generated. In other words, FIG. 11 illustrates just an example configuration to facilitate understanding of at least some example embodiments of the inventive concepts, and is not intended to limit at least some example embodiments of the inventive concepts. At least one example embodiment of the inventive concepts may be implemented with a different configuration from that shown in FIG. 11.

According to an example embodiment shown in FIG. 11, the phase difference calculator 3353 and the depth map generator 3354 may be implemented in the image signal processor 3350. For example, the image signal processor 3350 may be implemented in an operation processing device that includes an application processor. According to at least one example embodiment of the inventive concepts, the phase difference calculator 3353, the depth map generator 3354, and the lens position controller 3355 may be implemented in an operation processing device that includes an application processor.

However, at least some example embodiments of the inventive concepts are not limited to the configurations shown in FIG. 11. The image generating device 3300 may further include other components not shown in FIG. 11, or may not include one or more components shown in FIG. 11. FIG. 11 illustrates just an example configuration of the image generating device 3300.

Figure 12:
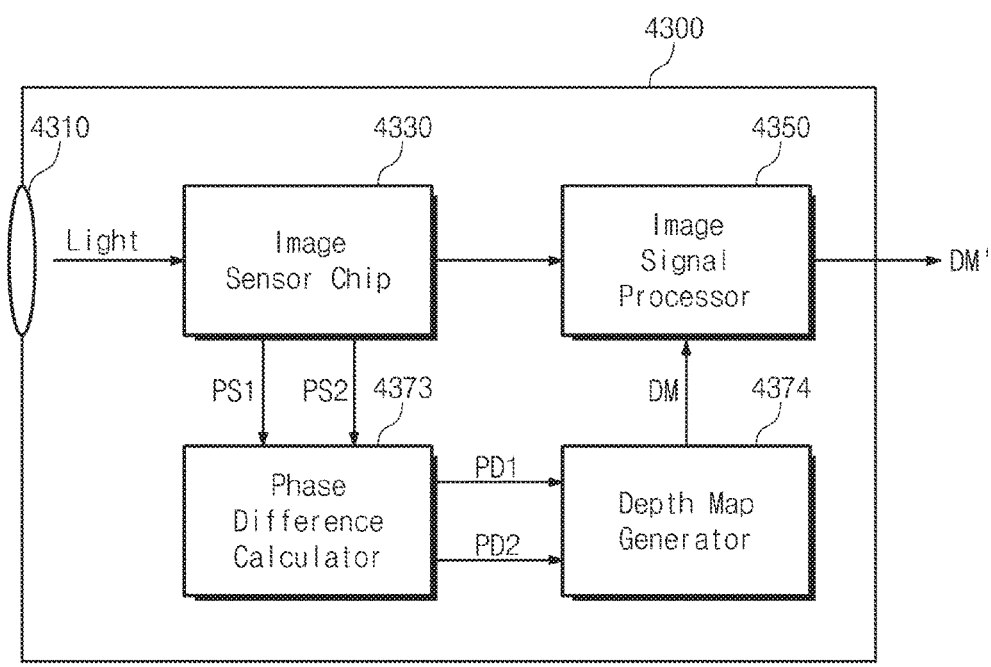

FIG. 12 is a block diagram illustrating an image generating device according to at least one example embodiment of the inventive concepts. Referring to FIG. 12, an image generating device 4300 may include a lens 4310, an image sensor chip 4330, an image signal processor 4350, a phase difference calculator 4373, and a depth map generator 4374.

Configurations and functions of the lens 4310 may include those of the lens 1310, which have been described with reference to FIGS. 1 to 9. Redundant descriptions associated with the lens 4310 will be omitted below for brevity of the description. Light passing through the lens 3310 may be provided to the image sensor chip 4330.

The image sensor chip 4330 may include an image sensor 1331 (refer to FIGS. 2 to 6). The image sensor 1331 may include a plurality of image sensor pixels and a plurality of phase detection pixels. The plurality of image sensor pixels may generate image signals corresponding to an object. The plurality of phase detection pixels may generate first phase signals PS1 and second phase signals PS2 that are used to calculate phase differences between images. The first phase signals PS1 may be generated when the lens 2310 is placed in a first position, and the second phase signals PS2 may be generated when the lens 2310 is placed in a second position. The configurations and functions of the image sensor 1331 have been described with reference to FIGS. 1 to 9.

The image signal processor 4350 may perform image signal processing to generate an appropriate image of an object. Configurations and functions of the image signal processor 4350 may include those of an image signal processor 1350 of FIG. 1. Redundant descriptions associated with the image signal processor 4350 will be omitted below for brevity of the description.

The phase difference calculator 4373 may receive the first phase signals PS1 and the second phase signals PS2 from the image sensor chip 4330. The phase difference calculator 4373 may calculate first phase differences PD1 and second phase differences PD2 based on the first phase signals PS1 and the second phase signals PS2, respectively. The depth map generator 4374 may generate a depth map DM based on the first phase differences PD1 and the second phase differences PD2.

Configurations and functions of the phase difference calculator 4373 and the depth map generator 4374 may include those of the phase difference calculator 103 and the depth map generator 104, which have been described with reference to FIGS. 7 to 9 (e.g., with reference to image generating device 100). Redundant descriptions associated with the phase difference calculator 4373 and the depth map generator 4374 will be omitted below for brevity of the description.

In an example embodiment, the image signal processor 4350 may perform image signal processing on the depth map DM generated by the depth map generator 4374. Accordingly, the image signal processor 4350 may generate a depth map DM' that is more appropriately processed.

However, in at least another example embodiment of the inventive concepts, the depth map DM generated by the depth map generator 4374 may be directly output from the image generating device 4300 without the image signal processing.

According to an example embodiment shown in FIG. 12, the phase difference calculator 4373 and the depth map generator 4374 may be separately provided from the image sensor chip 4330 and the image signal processor 4350. Alternatively, unlike FIGS. 10 to 12, the phase difference calculator 103 and the depth map generator 104 may be implemented to be distributed to the image sensor chip 1330 and the image signal processor 1350. The phase difference calculator 103 and the depth map generator 104 according to at least some example embodiments of the inventive concepts may be implemented in one of various configurations.

However, at least some example embodiments of the inventive concepts are not limited to the configurations shown in FIG. 12. The image generating device 4300 may further include other components not shown in FIG. 12, or may not include one or more components shown in FIG. 12. FIG. 12 illustrates one of possible example configurations of the image generating device 4300.

As described above, the image generating device according to at least one example embodiment of the inventive concepts may generate a depth map concurrently with capturing an object. An image generating device according to at least another example embodiment of the inventive concepts may directly access a memory device or a storage device by a direct memory access (DMA) operation. The memory device or the storage device may store previously generated phase information. In this example embodiment, the image generating device may generate a depth map based on the phase information stored in the memory device or the storage device. In this example embodiment, the image generating device may not include a lens and some of functions of an image sensor chip. At least one example embodiment of the inventive concepts may be changed or modified to one of various configurations.

Figure 13:
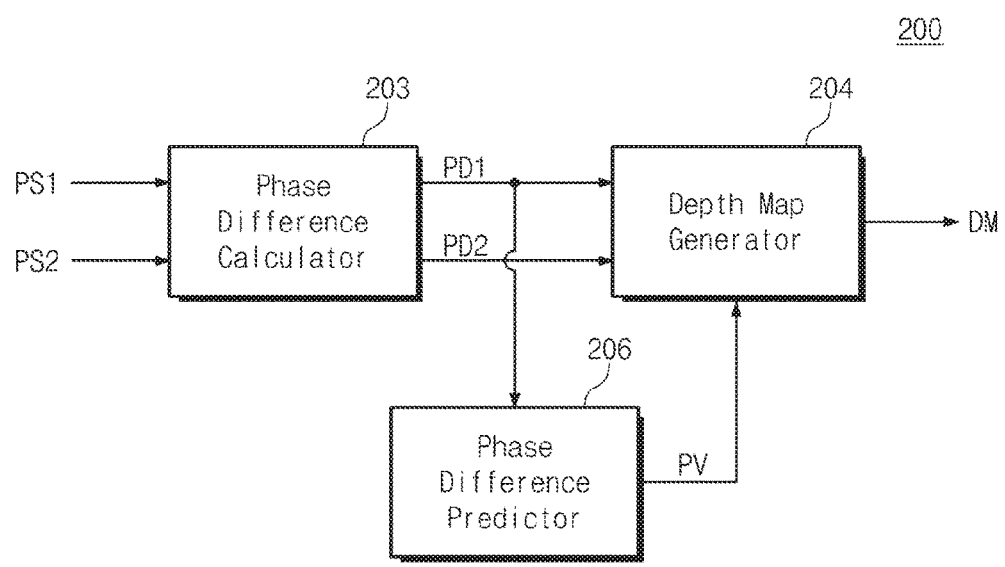

FIG. 13 is a block diagram illustrating an image generating device according to at least one example embodiment of the inventive concepts. Referring to FIG. 13, an image generating device 200 may include a phase difference calculator 203, a depth map generator 204, and a phase difference predictor 206.

According to at least one example embodiment of the inventive concepts, the image generating device 200 may include or be implemented by one or more circuits or circuitry (e.g., hardware) specifically structured to carry out some or all of the operations described herein as being performed by the image generating device 200 (or an element thereof). According to at least one example embodiment of the inventive concepts, the image generating device 200 may include or be implemented by a memory and one or more processors executing computer-readable code (e.g., software) that is stored in the memory and includes instructions corresponding to some or all of the operations described herein as being performed by the image generating device 200 (or an element thereof). According to at least one example embodiment of the inventive concepts, the image generating device 200 may be implemented by, for example, a combination of the above-referenced hardware and processors executing computer-readable code.

The phase difference calculator 203, the depth map generator 204, and the phase difference predictor 206 may be implemented in one of an image sensor chip 1330 (refer to FIG. 1) and an image signal processor 1350 (refer to FIG. 1), or may be implemented to be distributed to the image sensor chip 1330 and the image signal processor 1350. Alternatively, the phase difference calculator 203, and the depth map generator 204, and the phase difference predictor 206 may be separately provided from the image sensor chip 1330 and the image signal processor 1350.

The phase difference calculator 203 may receive first phase signals PS1 and second phase signals PS2. The phase difference calculator 203 may calculate first phase differences PD1 and second phase differences PD2 based on the first phase signals PS1 and the second phase signal PS2, respectively. The depth map generator 204 may generate a depth map DM based on the first phase differences PD1 and the second phase differences PD2.

Configurations and functions of the phase difference calculator 203 and the depth map generator 204 may include those of the phase difference calculator 103 and the depth map generator 104, which have been described with reference to FIGS. 7 to 9 (e.g., with reference to image generating device 100). Redundant descriptions associated with the phase difference calculator 203 and the depth map generator 204 will be omitted below for brevity of the description.

The phase difference predictor 206 may predict values to be calculated as the second phase differences PD2, based on the first phase differences PD1. The phase difference predictor 206 may provide the predicted values PV to the depth map generator 204. The depth map generator 204 may generate a depth map DM with reference to the predicted values PV together with the first phase differences PD1 and the second phase differences PD2.

The first phase differences PD1 may be calculated when a lens 1310 (refer to FIG. 1) is placed in a first position. Based on the first phase differences PD1, capturing environments, such as an in-focus position of the lens 1310, a distance between an object and an image sensor 1331 (refer to FIGS. 2 to 6), and a distance between the lens 1310 and the image sensor 1331, may be obtained. When the capturing environments are obtained, the values to be calculated as the second phase differences PD2 when the lens 1310 moves to a second position may be predicted.

For example, as the lens 1310 moves from the first position to the second position, the first phase differences PD1 may be calculated earlier than the second phase differences PD2. The phase difference predictor 206 may predict the values to be calculated as the second phase differences PD2 before the lens 1310 moves to the second position. Alternatively, the phase difference predictor 206 may predict the values to be calculated as the second phase differences PD2 while the lens 1310 moves to the second position. Herein, this example is just provided to facilitate understanding of at least some example embodiments of the inventive concepts, and is not intended to limit at least some example embodiments of the inventive concepts.

In some cases, the values PV predicted by the phase difference predictor 206 may differ from the second phase differences PD2 actually calculated by the phase difference calculator 203. By way of an example, when at least one of the first phase differences PD1 and the second phase differences PD2 includes an error, the predicted values PV may differ from the second phase differences PD2. Accordingly, when the predicted values PV differ from the second phase differences PD2, it is necessary to correct the error.

According to at least one example embodiment of the inventive concepts, when a difference between the predicted values PV and the second phase differences PD2 is greater than a reference value, processing for correcting an error may be performed. The reference value may be a fixed value or an adjustable value. The reference value may be differently selected in each example embodiment. According to at least another example embodiment of the inventive concepts, when the predicted values PV are different from the second phase differences PD2, processing for correcting an error may be performed.

Processing for correcting an error may be performed in various ways. According to at least one example embodiment of the inventive concepts, in order to correct an error, the depth map generator 204 may generate a depth map DM with reference to a difference between the predicted values PV and the second phase differences PD2. By way of an example, the depth map generator 204 may generate the depth map DM based on an average of the predicted values PV and the second phase differences PD2.

By way of another example, the depth map generator 204 may collect information associated with a position of the lens 1310 that makes phase differences be more accurately calculated. For example, the depth map generator 204 may collect the information periodically during repeated capturing or whenever a specific condition is satisfied. The depth map generator 204 may determine reliability of each of the first phase differences PD1 and the second phase differences PD2 based on the collected information. The depth map generator 204 may assign a higher weight to phase differences having higher reliability among the first phase differences PD1 and the second phase differences PD2, and may calculate a weighted average of the first phase differences PD1 and the second phase differences PD2. The depth map generator 204 may generate the depth map DM based on the calculated weighted average.

According to at least another example embodiment of the inventive concepts, in order to correct an error, the phase difference calculator 203 may further calculate other phase differences. For example, the lens 1310 may move to a third position that is different from the first position and the second position. When the lens 1310 is placed in the third position, a plurality of phase detection pixels of the image sensor 1331 may generate third phase signals. The phase difference calculator 203 may calculate third phase differences based on the third phase signals. The depth map generator 204 may generate the depth map DM based on the first phase differences PD1, the second phase differences PD2, and the third phase differences.

When the third phase differences are further calculated, it may be determined whether which ones of the first phase differences PD1 and the second phase differences PD2 have higher reliability. For example, when the third phase differences are more similar to the first phase differences PD1 than the second phase differences PD2, it may be regarded that the first phase differences PD1 have higher reliability than the second phase differences PD2. In this instance, the depth map generator 204 may assign higher reliability to the first phase differences PD1 and the third phase differences, and may calculate a weighted average of the first phase differences PD1, the second phase differences PD2, and the third phase differences. The depth map generator 204 may generate the depth map DM based on the calculated weighted average. In some other example embodiments, the phase difference calculator 203 may further calculate other phase differences other than the third phase differences.

Herein, the above-described example embodiments are just provided to facilitate understanding of at least some example embodiments of the inventive concepts. Conditions and processing for correcting an error may be changed or modified in various ways.

Figure 14:
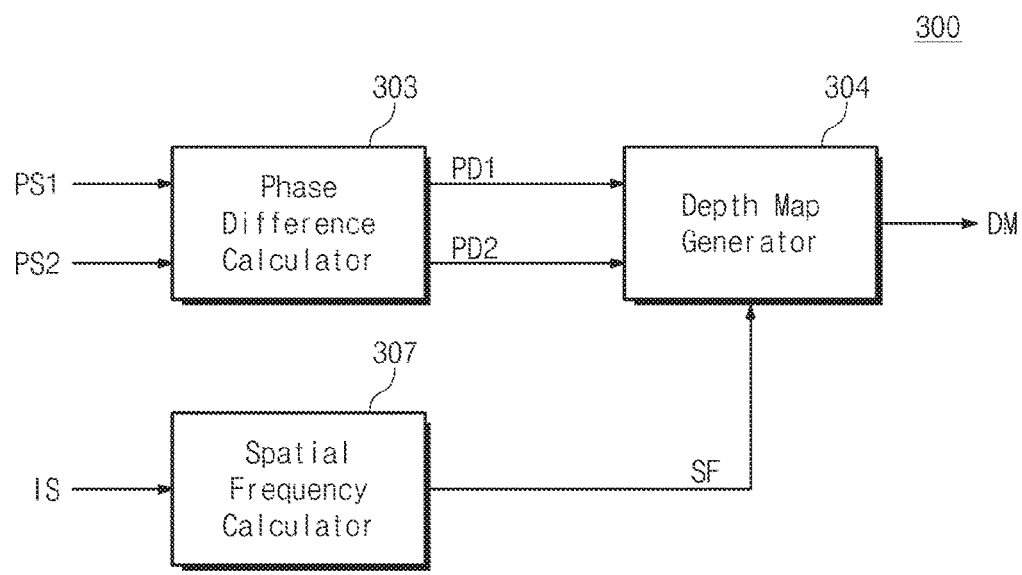

FIG. 14 is a block diagram illustrating an image generating device according to at least one example embodiment of the inventive concepts. Referring to FIG. 14, an image generating device 300 may include a phase difference calculator 303, a depth map generator 304, and a spatial frequency calculator 307.

According to at least one example embodiment of the inventive concepts, the image generating device 300 may include or be implemented by one or more circuits or circuitry (e.g., hardware) specifically structured to carry out some or all of the operations described herein as being performed by the image generating device 300 (or an element thereof). According to at least one example embodiment of the inventive concepts, the image generating device 300 may include or be implemented by a memory and one or more processors executing computer-readable code (e.g., software) that is stored in the memory and includes instructions corresponding to some or all of the operations described herein as being performed by the image generating device 300 (or an element thereof). According to at least one example embodiment of the inventive concepts, the image generating device 300 may be implemented by, for example, a combination of the above-referenced hardware and processors executing computer-readable code.

The phase difference calculator 303, the depth map generator 304, and the spatial frequency calculator 307 may be implemented in one of an image sensor chip 1330 (refer to FIG. 1) and an image signal processor 1350 (refer to FIG. 1), or may be implemented to be distributed to the image sensor chip 1330 and the image signal processor 1350. Alternatively, the phase difference calculator 303, and the depth map generator 304, and the spatial frequency calculator 307 may be separately provided from the image sensor chip 1330 and the image signal processor 1350.

The phase difference calculator 303 may receive first phase signals PS1 and second phase signals PS2. The phase difference calculator 303 may calculate first phase differences PD1 and second phase differences PD2 based on the first phase signals PS1 and the second phase signal PS2, respectively. The depth map generator 304 may generate a depth map DM based on the first phase differences PD1 and the second phase differences PD2.

Configurations and functions of the phase difference calculator 303 and the depth map generator 304 may include those of the phase difference calculator 103 and the depth map generator 104, which have been described with reference to FIGS. 7 to 9 (e.g., with reference to image generating device 100). Redundant descriptions associated with the phase difference calculator 303 and the depth map generator 304 will be omitted below for brevity of the description.

According to at least one example embodiment of the inventive concepts, the spatial frequency calculator 307 may receive an image signal IS. The image signal IS may be generated by a plurality of image sensor pixels included in an image sensor 1331 (refer to FIGS. 2 to 6). As described above, the image signal IS may be used to generate an image of an object. The spatial frequency calculator 307 may generate information of a spatial frequency associated with an image where an object is captured, by processing the image signal IS.

A spatial frequency of an image may be associated with whether an object captured to generate the image is focused. Spatial frequency components of an image that is captured when an object is defocused may be intensively distributed on a low frequency region. On the other hand, spatial frequency components of an image that is captured when the object is focused may be evenly distributed from a low frequency region to a high frequency region.

According to at least one example embodiment of the inventive concepts, the spatial frequency calculator 307 may generate first spatial frequency information when a lens 1310 (refer to FIG. 1) is placed in a first position. The spatial frequency calculator 307 may generate second spatial frequency information when the lens 1310 is placed in a second position. As a position of the lens 1310 is changed from the first position to the second position, the first spatial frequency information may differ from the second spatial frequency information.

The spatial frequency calculator 307 may obtain a direction where a spatial frequency value is changed (i.e., increasing or decreasing of the amount of spatial frequency components of a high frequency region) when the lens 1310 moves from the first position to the second position, based on the first spatial frequency information and the second spatial frequency information. For example, it may be regarded that a spatial frequency value is changed in a positive direction when the amount of spatial frequency components of a high frequency region increases.

The spatial frequency calculator 307 may obtain the amount where a spatial frequency value is changed when the lens 1310 moves from the first position to the second position, based on the first spatial frequency information and the second spatial frequency information. The spatial frequency calculator 307 may provide the depth map generator 304 with spatial frequency information SF that includes the first spatial frequency information, the second spatial frequency information, the direction where the spatial frequency is changed, and the amount where the spatial frequency is changed, and so on.

The depth map generator 304 may generate the depth map DM with reference to the spatial frequency information SF together with the first phase differences PD1 and the second phase differences PD2. In particular, the depth map generator 304 may refer to the direction where the spatial frequency value is changed and/or the amount where the spatial frequency value is changed. The spatial frequency may be used to determine reliability of each of the first phase differences PD1 and the second phase differences PD2. The use of the spatial frequency will be further described with reference to FIGS. 15 and 16.

Figure 15:
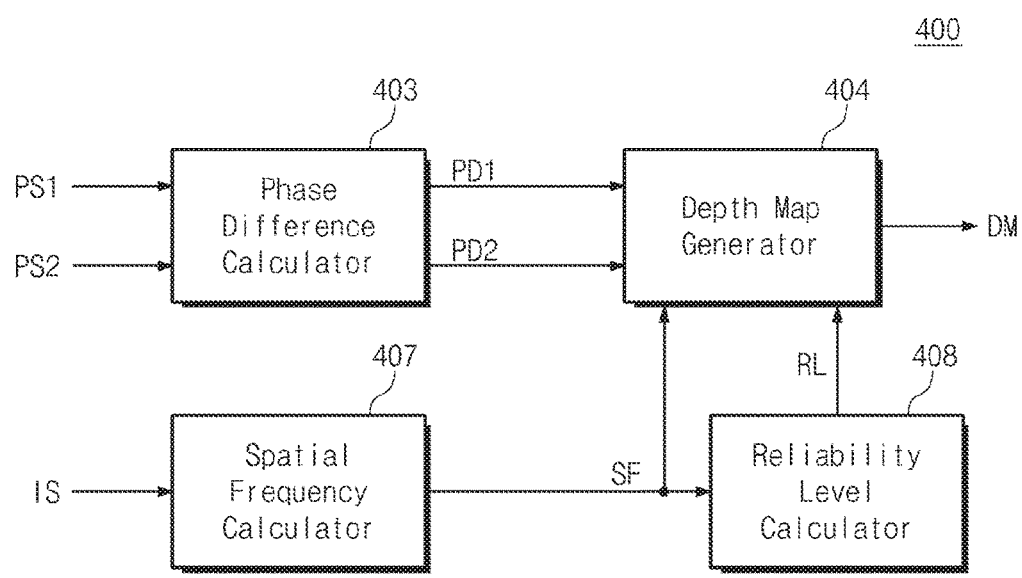

FIG. 15 is a block diagram illustrating an image generating device according to at least one example embodiment of the inventive concepts. Referring to FIG. 15, an image generating device 400 may include a phase difference calculator 403, a depth map generator 404, a spatial frequency calculator 407, and a reliability level calculator 408.

According to at least one example embodiment of the inventive concepts, the image generating device 400 may include or be implemented by one or more circuits or circuitry (e.g., hardware) specifically structured to carry out some or all of the operations described herein as being performed by the image generating device 400 (or an element thereof). According to at least one example embodiment of the inventive concepts, the image generating device 400 may include or be implemented by a memory and one or more processors executing computer-readable code (e.g., software) that is stored in the memory and includes instructions corresponding to some or all of the operations described herein as being performed by the image generating device 400 (or an element thereof). According to at least one example embodiment of the inventive concepts, the image generating device 400 may be implemented by, for example, a combination of the above-referenced hardware and processors executing computer-readable code.

The phase difference calculator 403, the depth map generator 404, the spatial frequency calculator 407, and the reliability level calculator 408 may be implemented in one of an image sensor chip 1330 (refer to FIG. 1) and an image signal processor 1350 (refer to FIG. 1), or may be implemented to be distributed to the image sensor chip 1330 and the image signal processor 1350. Alternatively, the phase difference calculator 403, the depth map generator 404, the spatial frequency calculator 407, and the reliability level calculator 408 may be separately provided from the image sensor chip 1330 and the image signal processor 1350.

The phase difference calculator 403 may receive first phase signals PS1 and second phase signals PS2. The phase difference calculator 403 may calculate first phase differences PD1 and second phase differences PD2 based on the first phase signals PS1 and the second phase signal PS2, respectively. The depth map generator 404 may generate a depth map DM based on the first phase differences PD1 and the second phase differences PD2.

Configurations and functions of the phase difference calculator 403 and the depth map generator 404 may include those of the phase difference calculator 103 and the depth map generator 104, which have been described with reference to FIGS. 7 to 9 (e.g., with reference to image generating device 100). Redundant descriptions associated with the phase difference calculator 403 and the depth map generator 404 will be omitted below for brevity of the description.

The spatial frequency calculator 407 may receive an image signal IS generated by a plurality of image sensor pixels included in an image sensor 1331 (refer to FIGS. 2 to 6). The spatial frequency calculator 407 may generate spatial frequency information SF by processing the image signal IS. The spatial frequency calculator 407 may provide the spatial frequency information SF to the depth map generator 404.

For example, the spatial frequency calculator 407 may generate first spatial frequency information associated with a first image where an object is captured, by processing first image signals generated when a lens 1310 (refer to FIG. 1) is placed in a first position. The spatial frequency calculator 407 may generate second spatial frequency information associated with a second image where an object is captured, by processing second image signals generated when the lens 1310 is placed in a second position. The spatial frequency calculator 407 may obtain a direction where a spatial frequency is changed and/or an amount where a spatial frequency is changed, based on the first spatial frequency information and the second spatial frequency information.

Configurations and functions of the spatial frequency calculator 407 may include those of the spatial frequency calculator 307, which have been described with reference to FIG. 14. Redundant descriptions associated with the spatial frequency calculator 407 will be omitted below for brevity of the description.

The reliability level calculator 408 may calculate a first reliability level associated with the first phase differences PD1. The reliability level calculator 408 may calculate a second reliability level associated with the second phase differences PD2. As described above, one or both of the first phase differences PD1 and the second phase differences PD2 may include an error. The reliability level calculator 408 may calculate reliability levels RL associated with errors included in the first phase differences PD1 and the second phase differences PD2. For example, the lower a level of an error is, the higher a reliability level is.

According to at least one example embodiment of the inventive concepts, the reliability level calculator 408 may calculate reliability levels RL based on a direction where a spatial frequency value is changed. For example, when a position of the lens 1310 becomes closer to an in-focus position in accordance with moving the lens 1310 from the first position to the second position, the amount of spatial frequency components of a high frequency region may increases. However, when one or both of the first phase differences PD1 and the second phase differences PD2 includes an error, it may seem that the amount of spatial frequency components of a high frequency region decreases although a position of the lens 1310 becomes closer to the in-focus position. In this case, the first phase differences PD1 or the second phase differences PD2 may have a low reliability level.

According to at least one example embodiment of the inventive concepts, the reliability level calculator 408 may collect information about a position of the lens 1310, that makes phase differences be more accurately calculated. For example, the reliability level calculator 408 may collect information periodically during repeated capturing or whenever a specific condition is satisfied. The reliability level calculator 408 may select phase differences to have a low or high reliability level among the first phase differences PD1 and the second phase differences PD2.

As another example, when the lens 1310 is placed in a third position that is different from the first position and the second position, third phase differences may be further generated. For example, the reliability level calculator 408 may select phase differences to have a low reliability level by comparing the first phase differences PD1, the second phase differences PD2, and the third phase differences with each other. In addition, the reliability level calculator 408 may determine a high reliability level for phase differences that are not selected.

According to at least one example embodiment of the inventive concepts, the depth map generator 404 may generate the depth map DM by reflecting the first reliability level and the second reliability level to first depth data generated based on the first phase differences PD1 and second depth data generated based on the second phase differences PD2. By way of an example, the depth map generator 404 may assign a higher weight to phase differences having a higher reliability level, and may calculate a weighted average. The depth map generator 404 may generate the depth map DM based on the calculated weighted average.

Figure 16:
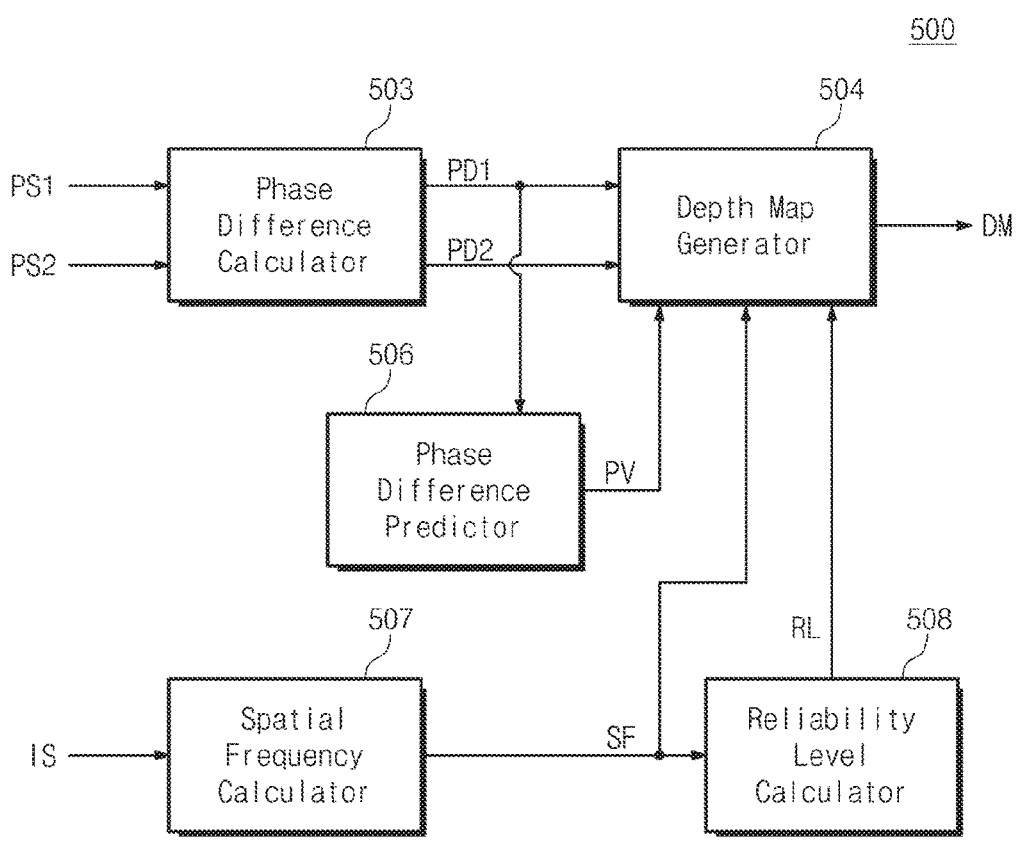

FIG. 16 is a block diagram illustrating an image generating device according to at least one example embodiment of the inventive concepts. Referring to FIG. 16, an image generating device 500 may include a phase difference calculator 503, a depth map generator 504, a phase difference predictor 506, a spatial frequency calculator 507, and a reliability level calculator 508.

According to at least one example embodiment of the inventive concepts, the image generating device 500 may include or be implemented by one or more circuits or circuitry (e.g., hardware) specifically structured to carry out some or all of the operations described herein as being performed by the image generating device 500 (or an element thereof). According to at least one example embodiment of the inventive concepts, the image generating device 500 may include or be implemented by a memory and one or more processors executing computer-readable code (e.g., software) that is stored in the memory and includes instructions corresponding to some or all of the operations described herein as being performed by the image generating device 500 (or an element thereof). According to at least one example embodiment of the inventive concepts, the image generating device 500 may be implemented by, for example, a combination of the above-referenced hardware and processors executing computer-readable code.

The phase difference calculator 503, the depth map generator 504, the phase difference predictor 506, the spatial frequency calculator 507, and the reliability level calculator 508 may be implemented in one of an image sensor chip 1330 (refer to FIG. 1) and an image signal processor 1350 (refer to FIG. 1), or may be implemented to be distributed to the image sensor chip 1330 and the image signal processor 1350. Alternatively, the phase difference calculator 503, the depth map generator 504, the phase difference predictor 506, the spatial frequency calculator 507, and the reliability level calculator 508 may be separately provided from the image sensor chip 1330 and the image signal processor 1350.

The phase difference calculator 503 may receive first phase signals PS1 and second phase signals PS2. The phase difference calculator 503 may calculate first phase differences PD1 and second phase differences PD2 based on the first phase signals PS1 and the second phase signal PS2, respectively. The depth map generator 504 may generate a depth map DM based on the first phase differences PD1 and the second phase differences PD2.

Configurations and functions of the phase difference calculator 503 and the depth map generator 504 may include those of the phase difference calculator 103 and the depth map generator 104, which have been described with reference to FIGS. 7 to 9 (e.g., with reference to image generating device 100). Redundant descriptions associated with the phase difference calculator 503 and the depth map generator 504 will be omitted below for brevity of the description.

The phase difference predictor 506 may predict values to be calculated as the second phase differences PD2, based on the first phase differences PD1. The phase difference predictor 506 may provide the predicted values PV to the depth map generator 504. Configurations and functions of the phase difference predictor 506 may include those of a phase difference predictor 206 of FIG. 13. Redundant descriptions associated with the phase difference predictor 506 will be omitted below for brevity of the description.

The spatial frequency calculator 507 may receive an image signal IS. The image signal IS may be generated by a plurality of image sensor pixels included in an image sensor 1331 (refer to FIGS. 2 to 6). The spatial frequency calculator 507 may generate spatial frequency information SF associated with an image where an object is captured, by processing the image signal IS. Configurations and functions of the spatial frequency calculator 507 may include those of a spatial frequency calculator 307 of FIG. 14 and/or those of a spatial frequency calculator 407 of FIG. 15. Redundant descriptions associated with the spatial frequency calculator 507 will be omitted below for brevity of the description.

The reliability level calculator 508 may calculate a first reliability level associated with the first phase differences PD1. The reliability level calculator 508 may calculate a second reliability level associated with the second phase differences PD2. By way of at least one example embodiment of the inventive concepts, the reliability level calculator 508 may calculate reliability levels RL based on at least one of the values PV predicted by the phase difference predictor 506, the first phase differences PD1, the second phase differences PD2, the spatial frequency information SF, and any combination thereof. Configurations and functions of the reliability level calculator 508 may include those of a reliability level calculator 408 of FIG. 15. Redundant descriptions associated with the reliability level calculator 508 will be omitted below for brevity of the description.

There must be consistency between a movement direction of a lens 1310 (refer to FIG. 1) and a change in spatial frequency. In addition, it is desired that the first phase differences PD1 and the second phase differences PD2 do not include an error, and the values PV predicted by the phase difference predictor 506 are identical to the second phase differences PD2 actually calculated by the phase difference calculator 503. When there is no consistency between the movement direction of the lens 1310 and the change in spatial frequency or when the predicted values PV are different from the second phase differences PD2, the reliability level calculator 508 may calculate reliability levels RL with reference to the inconsistency and the error.

The depth map generator 504 may generate the depth map DM based on the reliability levels RL together with the first phase differences PD1 and the second phase differences PD2. In an example embodiment, the depth map generator 504 may generate the depth map DM by reflecting the first reliability level and the second reliability level to first depth data generated based on the first phase differences PD1 and second depth data generated based on the second phase differences PD2. This example embodiment has been described with reference to FIG. 15.

Each of the phase difference calculator 503, the depth map generator 504, the phase difference predictor 506, the spatial frequency calculator 507, and the reliability level calculator 508 may be implemented with hardware such as an analog circuit and a logic circuit. Alternatively, functions of the phase difference calculator 503, the depth map generator 504, the phase difference predictor 506, the spatial frequency calculator 507, and the reliability level calculator 508 may be implemented by software.

The image generating device according to any example embodiment of, or alternatively, at least some example embodiments of, the inventive concepts may occupy a small area or bulk. In addition, according to any example embodiment of, or alternatively, at least some example embodiments of, the inventive concepts, the image generating device may generate a depth map having higher reliability by correcting an error with reference to multiple depth data.

Figure 17:
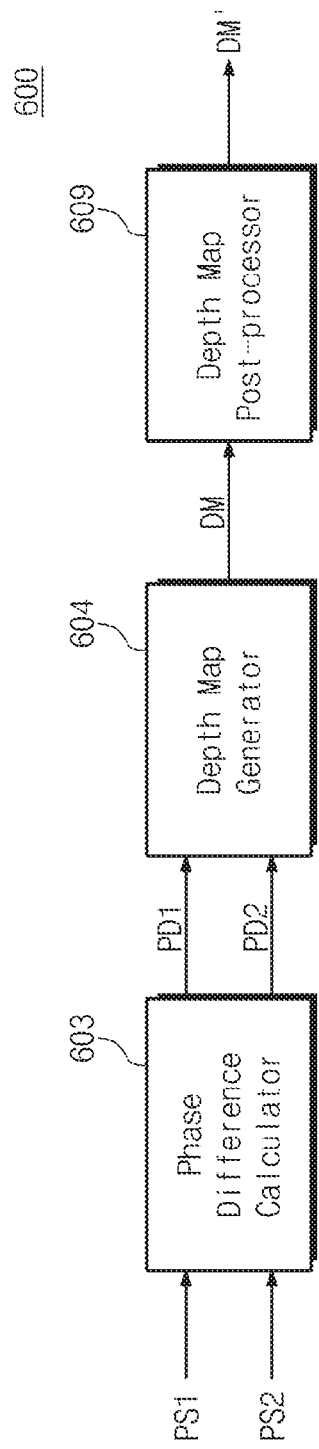

FIG. 17 is a block diagram illustrating an image generating device according to at least one example embodiment of the inventive concepts. Referring to FIG. 17, an image generating device 600 may include a phase difference calculator 603, a depth map generator 604, and a depth map post-processor 609.

According to at least one example embodiment of the inventive concepts, the image generating device 600 may include or be implemented by one or more circuits or circuitry (e.g., hardware) specifically structured to carry out some or all of the operations described herein as being performed by the image generating device 600 (or an element thereof). According to at least one example embodiment of the inventive concepts, the image generating device 600 may include or be implemented by a memory and one or more processors executing computer-readable code (e.g., software) that is stored in the memory and includes instructions corresponding to some or all of the operations described herein as being performed by the image generating device 600 (or an element thereof). According to at least one example embodiment of the inventive concepts, the image generating device 600 may be implemented by, for example, a combination of the above-referenced hardware and processors executing computer-readable code.

The phase difference calculator 603, the depth map generator 604, and the depth map post-processor 609 may be implemented in one of an image sensor chip 1330 (refer to FIG. 1) and an image signal processor 1350 (refer to FIG. 1), or may be implemented to be distributed to the image sensor chip 1330 and the image signal processor 1350. Alternatively, the phase difference calculator 603, the depth map generator 604, and the depth map post-processor 609 may be separately provided from the image sensor chip 1330 and the image signal processor 1350.

The phase difference calculator 603 may receive first phase signals PS1 and second phase signals PS2. The phase difference calculator 603 may calculate first phase differences PD1 and second phase differences PD2 based on the first phase signals PS1 and the second phase signal PS2, respectively. The depth map generator 604 may generate a depth map DM based on the first phase differences PD1 and the second phase differences PD2.

Configurations and functions of the phase difference calculator 603 and the depth map generator 604 may include those of the phase difference calculator 103 and the depth map generator 104, which have been described with reference to FIGS. 7 to 9 (e.g., with reference to image generating device 100). Redundant descriptions associated with the phase difference calculator 603 and the depth map generator 604 will be omitted below for brevity of the description.

The depth map post-processor 609 may change a resolution of the depth map DM. According to at least one example embodiment of the inventive concepts, the depth map post-processor 609 may perform image registration on an object image and the depth map DM. The object image may be an image generated based on image signals that is generated by a plurality of image sensor pixels included in an image sensor 1331 (refer to FIGS. 2 to 6). The depth map post-processor 609 may generate a depth map DM' having a changed resolution by performing image registration.

For example, as shown in FIG. 4, when a plurality of phase detection pixels are configured not to be overlapped with a plurality of image sensor chips, the depth map DM may have a lower resolution than that of the object image. The depth map post-processor 609 may estimate depth data corresponding to an image region where depth data are not obtained, with reference to the object image. For example, the depth map post-processor 609 may estimate the depth data corresponding to the image region where depth data are not obtained, by extracting edge components included in the object image and performing image registration on the edge components and the depth map DM.

In the above-described example, the depth map post-processor 609 may generate the depth map DM' having a changed resolution, based on the depth map DM and the estimated depth data. For example, the depth map DM' may have the same resolution as that of the object image by enhancing a resolution of the depth map DM.

However, at least some example embodiments of the inventive concepts are not limited the above example. The depth map post-processor 609 may change a resolution of the depth map DM in various ways. The depth map DM' may have a different resolution from that of the object image. A resolution of the depth map DM may be enhanced or reduced. In addition, as shown in FIG. 3, when one pixel unit is used as a phase detection pixel as well as an image sensor pixel, the depth map post-processor 609 may be employed to change a resolution of the depth map DM.

By way of an example, the depth map post-processor 609 may be configured to operate when a specific condition is satisfied. In this example, the image generating device 600 may further include a determination logic or circuit used to determine whether the depth map post-processor 609 will operate. By way of another example, the image generating device 600 may further include an additional control signal line or an additional user interface. The image generating device 600 may receive an instruction for operating the depth map post-processor 609 through the additional control signal line or the additional user interface.

Figure 18:
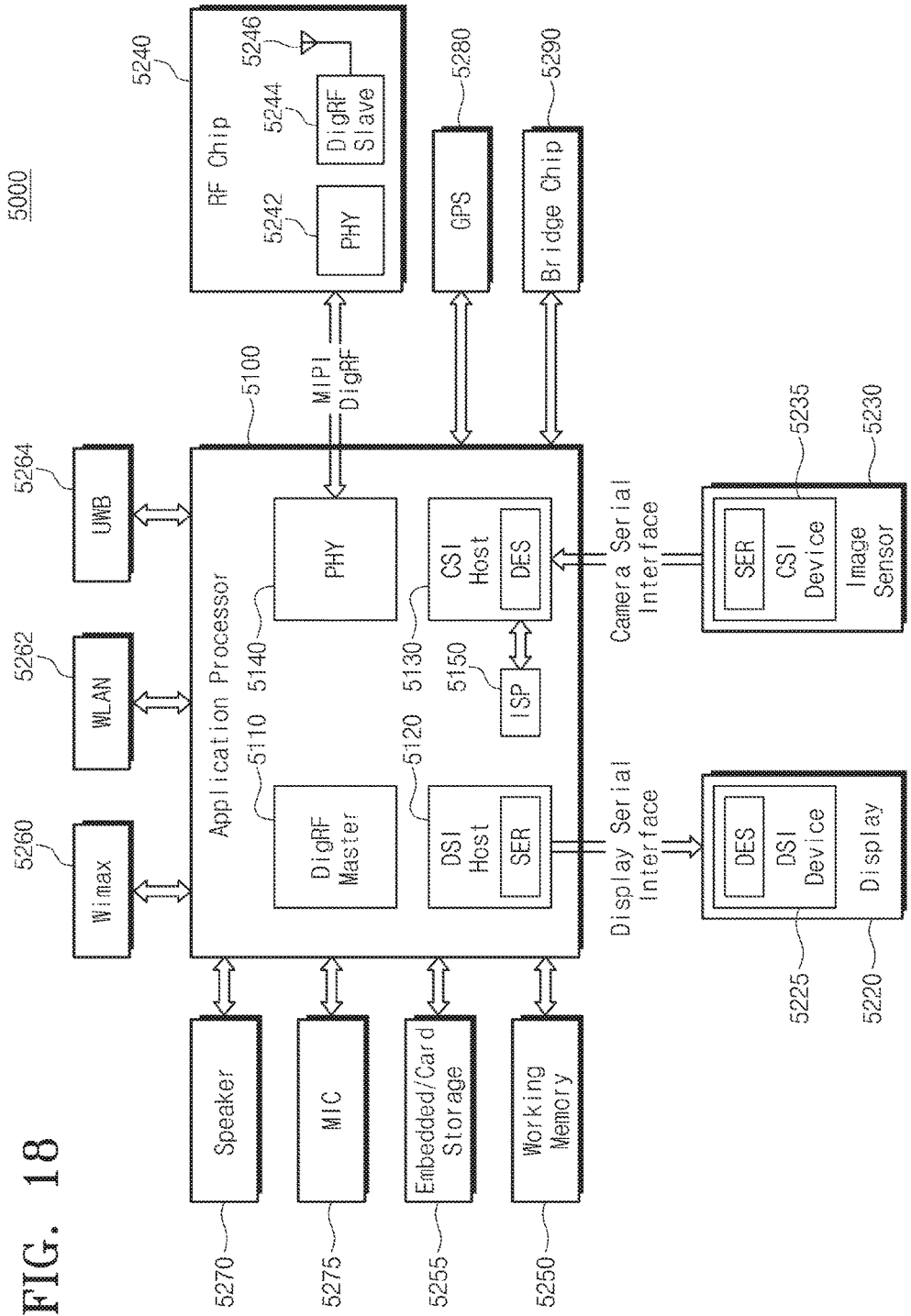
FIG. 18 is a block diagram illustrating an electronic device including an image generating device according to at least one example embodiment of the inventive concepts and interfaces thereof.

FIG. 18 is a block diagram illustrating an electronic device including an image generating device according to at least one example embodiment of the inventive concepts and interfaces thereof. An electronic system 5000 may be implemented with a data processing device that may employ or support an interface proposed by a mobile industry processor interface (MIPI) alliance. For example, the electronic system 5000 may be implemented with an electronic device, such as a portable communication terminal, a personal digital assistant (PDA), a portable media player (PMP), a smart phone, or a wearable device.

The electronic system 5000 may include an application processor 5100, a display 5220, and an image sensor 5230. The application processor 5100 may include a DigRF master 5110, a display serial interface (DSI) host 5120, a camera serial interface (CSI) host 5130, a physical layer (PHY) 5140, and an image signal processor (ISP) 5150.

The DSI host 5120 may communicate with a DSI device 5225 of the display 5220 in compliance with DSI. For example, an optical serializer (SER) may be implemented in the DSI host 5120. For example, an optical deserializer (DES) may be implemented in the DSI device 5225.

The CSI host 5130 may communicate with a CSI device 5235 of the image sensor 5230 in compliance with CSI. For example, an optical DES may be implemented in the CSI host 5130. For example, an optical SER may be implemented in the CSI device 5235. The ISP 5150 may communicate with the CSI host 5130 through a memory (e.g., a working memory 5250 or an embedded memory of the application processor 5110) and a bus.

At least one of the ISP 5150, the image sensor 5230, and any combination thereof may be configured according to at least one of at least some example embodiments of the inventive concepts, which have been described with reference to FIGS. 1 to 17. For example, as described in FIG. 10, the image sensor 5230 may move a lens to each of two or more positions, may generate multiple depth data using a plurality of phase detection pixels, and may generate a depth map based on the multiple depth data. For example, as described in FIG. 11, the ISP 5150 may generate a lens driving signal to move a lens to each of two or more positions, and may generate a depth map based on multiple depth data generated using a plurality of phase detection pixels. Redundant descriptions about at least some example embodiments of the inventive concepts will be omitted below.

The electronic system 5000 may further include a radio frequency (RF) chip 5240 that communicates with the application processor 5100. The RF chip 5240 may include a PHY 5242, a DigRF slave 5244, and an antenna 5246. For example, the PHY 5242 of the RF chip 5240 and the PHY 5140 of the application processor 5100 may exchange data with each other by DigRF interface proposed by the MIPI alliance.

The electronic system 5000 may further include the working memory 5250 and an embedded/card storage 5255. The working memory 5250 and the embedded/card storage 5255 may store data provided from the application processor 5100. In addition, the working memory 5250 and the embedded/card storage 5255 may provide the application processor 5100 with the data stored therein.

The working memory 5250 may temporarily store data that are processed or to be processed by the application processor 5100. The working memory 5250 may include a volatile memory, such as a static random access memory (SRAM), a dynamic RAM (DRAM), and a synchronous DRAM (SDRAM), and/or a nonvolatile memory, such as a flash memory, a phase-change RAM (PRAM), a magneto-resistive RAM (MRAM), a resistive RAM (ReRAM), and a ferro-electric RAM (FRAM). The embedded/card storage 5255 may store data regardless of power supply.

The electronic system 5000 may communicate with an external system through a communication module, such as at least one of a worldwide interoperability for microwave access (Wimax) 5260, a wireless local area network (WLAN) 5262, an ultra-wideband (UWB), and any combination thereof. The electronic system 5000 may further include a speaker 5270 and a microphone 5275 for processing voice information. In addition, the electronic system 5000 may further include a global positioning system (GPS) device 5280 for processing position information. The electronic system 5000 may further include a bridge chip 5290 for managing connection(s) with peripheral devices.

According to at least some example embodiments of the inventive concepts, an area or bulk occupied by the image generating device may be reduced. In addition, according to at least some example embodiments of the inventive concepts, the image generating device may generate a depth map having higher reliability by correcting an error with reference to multiple depth data.

A configuration illustrated in each conceptual diagram should be understood just from a conceptual point of view. Shape, structure, and size of each component illustrated in each conceptual diagram are exaggerated or downsized for understanding of example embodiments of the inventive concepts. An actually implemented configuration may have a physical shape different from a configuration of each conceptual diagram. At least some example embodiments of the inventive concepts are not limited to a physical shape or size illustrated in each conceptual diagram.

A device configuration illustrated in each block diagram is provided to help understanding of at least some example embodiments of the inventive concepts. Each block may be formed of smaller blocks according to functions. Alternatively, a plurality of blocks may form a larger block according to a function. That is, at least some example embodiments of the inventive concepts are not limited to components illustrated in a block diagram.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image generating device comprising:
    an image sensor including,
        a plurality of image sensor pixels configured to generate image signals corresponding to an object, and
        a plurality of phase detection pixels configured to generate first and second phase signals used to calculate a phase difference between images;
    a lens driver configured to adjust a position of a lens to adjust a distance between the lens and the object;
    a phase difference calculator configured to,
        calculate first phase differences based on the first phase signals, the first phase signals being generated when the lens is in a first position, and
        calculate second phase differences based on the second phase signals, the second phase signals being generated after the lens is moved from the first position to a second position that is different from the first position;
    a phase difference predictor configured to predict values of the second phase differences based on the calculated first phase differences;
    a reliability level calculator configured to calculate a first reliability level associated with the first phase differences and a second reliability level associated with the second phase differences, based on at least one of the predicted values of the second phase differences, the calculated second phase differences, and a direction of a change in a spatial frequency value when the lens moves from the first position to the second position; and
    a depth map generator configured to,
        generate first depth data and second depth data based on the first phase differences and the second phase differences, respectively, each of the first depth data and the second depth data being associated with a distance between the plurality of phase detection pixels and the object, and
        generate a depth map based on both the first depth data and the second depth data, by applying weight values to the first depth data and the second depth data based on the first reliability level and the second reliability level, respectively, such that an error included in the first depth data or the second depth data is corrected to generate the depth map.

2. The image generating device of claim 1, wherein
    the phase difference calculator is configured to calculate the first phase differences before the second phase differences are calculated as the lens moves from the first position to the second position under a control of the lens driver, and
    the phase difference predictor is configured to predict the values of the second phase differences before or while the lens moves to the second position.

3. The image generating device of claim 1, wherein the depth map generator is configured such that, when a difference between the values predicted by the phase difference predictor and the second phase differences calculated by the phase difference calculator is greater than a reference value, the depth map generator generates the depth map with reference to the difference.

4. The image generating device of claim 1, wherein each of the plurality of phase detection pixels corresponds to two of the plurality of image sensor pixels.

5. The image generating device of claim 1, wherein the plurality of phase detection pixels are arranged in different positions from the plurality of image sensor pixels such that the plurality of phase detection pixels do not overlap with the plurality of image sensor pixels.

6. The image generating device of claim 1, further comprising:
    a spatial frequency calculator configured to generate information of a spatial frequency associated with an image where the object is captured, by processing the image signals.

7. The image generating device of claim 6, wherein the spatial frequency calculator is configured to:

generate first spatial frequency information when the lens is placed in the first position, and
generate second spatial frequency information when the lens is placed in the second position.

8. The image generating device of claim 7, wherein
the spatial frequency calculator is further configured to obtain at least one of a direction and a quantity of a change in a spatial frequency value when the lens moves from the first position to the second position, based on the first and second spatial frequency information, and
the depth map generator is configured to generate the depth map with reference to at least one of the direction and the quantity of the change in the spatial frequency value.

9. The image generating device of claim 1, further comprising:
an image sensor chip including the image sensor, the lens driver, the phase difference calculator, and the depth map generator.

10. An image generating device comprising:
a phase difference calculator configured to,
receive first and second phase signals generated by a plurality of phase detection pixels included in an image sensor,
calculate first phase differences based on the first phase signals, the first phase signals being generated when a lens is in a first position, the lens being configured to move in a direction where a distance from an object increases or decreases, and
calculate second phase differences based on the second phase signals, the second phase signals being generated after the lens is moved from the first position to a second position that is different from the first position;
a phase difference predictor configured to predict values of the second phase differences based on the calculated first phase differences;
a reliability level calculator configured to calculate a first reliability level associated with the first phase differences and a second reliability level associated with the second phase differences, based on at least one of the predicted values of the second phase differences, the calculated second phase differences, and a direction of a change in a spatial frequency value when the lens moves from the first position to the second position;
a lens position controller configured to,
calculate an in-focus position of the lens for focusing on the object based on at least one of the first and second phase differences, and
generate a lens driving signal to move the lens to the in-focus position; and
a depth map generator configured to,
generate first depth data and second depth data based on the first phase differences and the second phase differences, respectively, each of the first depth data and the second depth data being associated with a distance between the plurality of phase detection pixels and the object, and
generate a depth map based on both the first depth data and the second depth data, by applying weight values to the first depth data and the second depth data based on the first reliability level and the second reliability level, respectively, such that an error included in the first depth data or the second depth data is corrected to generate the depth map.

11. The image generating device of claim 10, wherein one of the first position and the second position corresponds to the in-focus position.

12. The image generating device of claim 10, further comprising:
a spatial frequency calculator configured to generate information of a spatial frequency associated with an image where the object is captured, by processing image signals generated by a plurality of image sensor pixels included in the image sensor.

13. The image generating device of claim 10, further comprising:
a depth map post-processor configured to change a resolution of the depth map by performing image registration on an object image and the depth map, the object image being generated based on image signals that are generated by a plurality of image sensor pixels included in the image sensor.

14. The image generating device of claim 10, further comprising:
an operation processing device including an application processor, the operation processing device being configured to implement at least the phase difference calculator, the lens position controller, and the depth map generator.

15. An image generating device comprising:
a lens;
an image sensor including,
a plurality of image sensor pixels configured to generate image signals corresponding to an object, and
a plurality of phase detection pixels configured to generate first and second phase signals,
a position of the lens being movable with respect to a position of the image sensor;
a memory storing computer-readable instructions; and
one or more processors configured to execute the computer-readable instructions to,
determine first phase differences based on the first phase signals, the first phase signals being generated based on the lens being located in a first position relative to the image sensor,
determine second phase differences based on the second phase signals, the second phase signals being generated based on the lens being moved from the first position to a second position relative to the image sensor,
generate first and second depth data based on the first and second phase differences, respectively, each of the first and second depth data indicating a distance between the plurality of phase detection pixels and the object,
generate a depth map based on both the first and second depth data such that an error included in the first depth data or the second depth data is corrected to generate the depth map, and
perform depth map post-processing to change a resolution of the depth map by performing image registration on an object image and the depth map, the object image being generated based on the image signals generated by the plurality of image sensor pixels included in the image sensor.

16. The image generating device of claim 15 further comprising:
a lens driver configured to selectively change the position of the lens relative to the image sensor.

17. The image generating device of claim 16, wherein the one or more processors are further configured to predict values of the second phase differences based on the first phase differences.

* * * * *